United States Patent [19]

Garrick et al.

[11] Patent Number: 5,968,125
[45] Date of Patent: Oct. 19, 1999

[54] PROCESS FOR OPTIMIZING THE EFFECTIVENESS OF A HYPERTEXT ELEMENT

[75] Inventors: George R. Garrick, Chicago; Scott D. Weaver, Deerfield, both of Ill.

[73] Assignee: Net. Roi, Chicago, Ill.

[21] Appl. No.: 08/787,532

[22] Filed: Jan. 21, 1997

[51] Int. Cl.[6] .................................................. G06F 13/00
[52] U.S. Cl. ......................... 709/224; 709/219; 707/501; 707/513
[58] Field of Search ..................................... 709/203, 219, 709/207, 231, 224, 217, 218; 705/10; 395/200.54; 707/501, 513

[56] References Cited

U.S. PATENT DOCUMENTS

| | | | |
|---|---|---|---|
| B 4,777,596 | 6/1996 | Shaffer et al. | 364/419 |
| 5,541,911 | 7/1996 | Nilakantan et al. | 370/13 |
| 5,708,780 | 1/1998 | Levergood et al. | 709/218 X |
| 5,732,218 | 3/1998 | Bland et al. | 709/229 X |
| 5,848,396 | 12/1998 | Gerace | 705/10 |
| 5,864,852 | 1/1999 | Luotonen | 707/10 |
| 5,870,559 | 2/1999 | Leshem et al. | 709/224 |

OTHER PUBLICATIONS

Ari Luotonen et al., World–Web Proxies, CERN, Apr. 1994, pp. 1–8, W3C, http://www.w3.org/.

Primary Examiner—Zarni Maung
Assistant Examiner—Patrice L. Winder

[57] ABSTRACT

A process for optimizing the effectiveness of a web site analyzes various hypertext variables of hypertext documents formed from Hyper Text Mark-up Language (HTML) to identify weak links in order to improve compliances with the business objective for the web site. A plurality of alternate hypertext documents are created and placed in parallel paths relative to the original hypertext document according to a predetermined distribution pattern which may be sequential, equal distribution or random distribution, for example. Accesses to the web site are redirected to the alternative hypertext elements transparently. Access logs for each of the alternative hypertext documents are analyzed to determine the most effective alternative hypertext document, according to a predetermined criteria. The most effective hypertext element is then substituted for the original hypertext element in order to improve the effectiveness of the web site.

8 Claims, 22 Drawing Sheets

STEP 1- DEFINE AND PRIORITIZE WEBSITE OBJECTIVES

STEP 2- SPECIFY TARGET PAGE AND COMPLIANCE FOR EACH OBJECTIVE

STEP 3- CONDUCT WEB SERVER LOG ANALYSIS

STEP 4- IDENTIFY AND PRIORITIZE OPPORTUNITIES

STEP 5- DESIGN TEST FOR EACH OPPORTUNITY

Fig. 16

Products

Sample Bikes' Web Bike™

"The hottest new bike to hit the net"

- 26-inch Frame, under 5 lbs., Aluminum Alloy construction, 45 speeds, cushioned seat
- Folds down to 24"x24" for easy transportation in the leather carrying case (included):

Information Request Form

Select the items that apply, and then let us know how to contact you

☑ Send product literature
☐ Send company literature
☐ Have a salesperson contact me Name:
Title:
Company:
Address:
E-mail:
Phone:

Home  Products  Feedback

Send mail to webmaster@samplebikes.com with questions or comments about this web site.

Fig. 18

Feedback

Home  Products  Feedback

Please tell us what you think about our web site, company, products, or services. If you provide us with your contact information, we will be able to reach you in case we have any questions.

Comments

Category

Web site

Contact Information

Name
Company
Address
Telephone
E-mail

Home  Products  Feedback

Send mail to webmaster@samplebikes.com with questions or comments about this web site.

Fig. 19

Form Confirmation

Thank you for submitting the following information:

Category: Products
Name: John Q. Public
Company:
Address: 123 Main Street, Anytown, USA 12345
Telephone: (847)555-1234
E-mail: jqpublic@anytown.isp.com

Comments

I think you make the best bikes in the world.

Return to the form.

Fig. 21A1

```
dev179.crown.icongrp.com - - [04/Sep/1996:06:57:34 -0500] "GET /careers.htm HTTP/1.0" 200 9251
sweaver.pr.mcs.net - - [04/Sep/1996:08:35:06 -0500] "GET /corpalt1.htm HTTP/1.0" 200 2105
sweaver.pr.mcs.net - - [04/Sep/1996:08:35:18 -0500] "GET /index1.gif HTTP/1.0" 200 16633
sweaver.pr.mcs.net - - [04/Sep/1996:08:35:30 -0500] "GET /corpinfo.htm HTTP/1.0" 302 -
sweaver.pr.mcs.net - - [04/Sep/1996:08:35:31 -0500] "GET /select1.pl HTTP/1.0" 200 4465
sweaver.pr.mcs.net - - [04/Sep/1996:08:47:57 -0500] "GET /corpalt2.htm HTTP/1.0" 200 2250
sweaver.pr.mcs.net - - [04/Sep/1996:08:48:18 -0500] "GET /corpalt3.htm HTTP/1.0" 200 4227
sweaver.pr.mcs.net - - [04/Sep/1996:08:48:34 -0500] "GET /corpalt4htm HTTP/1.0" 404 -
sweaver.pr.mcs.net - - [04/Sep/1996:08:48:51 -0500] "GET /corpalt4.htm HTTP/1.0" 200 4443
sweaver.pr.mcs.net - - [04/Sep/1996:08:49:27 -0500] "GET /index.htm HTTP/1.0" 200 2997
sweaver.pr.mcs.net - - [04/Sep/1996:08:49:40 -0500] "GET /index1.gif HTTP/1.0" 200 16633
sweaver.pr.mcs.net - - [04/Sep/1996:08:51:20 -0500] "GET /thanks.htm HTTP/1.0" 200 670
sweaver.pr.mcs.net - - [04/Sep/1996:08:51:22 -0500] "GET /index1.jpg HTTP/1.0" 200 5258
sweaver.pr.mcs.net - - [04/Sep/1996:09:06:55 -0500] "GET / HTTP/1.0" 200 3027
sweaver.pr.mcs.net - - [04/Sep/1996:09:07:04 -0500] "GET /images/index1.gif HTTP/1.0" 200 16633
sweaver.pr.mcs.net - - [04/Sep/1996:09:07:37 -0500] "GET /corpinfo.htm HTTP/1.0" 302 -
sweaver.pr.mcs.net - - [04/Sep/1996:09:07:38 -0500] "GET /select1.pl HTTP/1.0" 200 2181
sweaver.pr.mcs.net - - [04/Sep/1996:09:09:34 -0500] "GET /select1.pl HTTP/1.0" 200 2272
sweaver.pr.mcs.net - - [04/Sep/1996:09:10:11 -0500] "GET /select1.pl HTTP/1.0" 200 4249
sweaver.pr.mcs.net - - [04/Sep/1996:09:10:53 -0500] "GET /select1.pl HTTP/1.0" 200 4465
sweaver.pr.mcs.net - - [04/Sep/1996:09:11:48 -0500] "GET /thanks.htm HTTP/1.0" 200 823
sweaver.pr.mcs.net - - [04/Sep/1996:09:43:06 -0500] "GET /thanks.htm HTTP/1.0" 200 841
sweaver.pr.mcs.net - - [04/Sep/1996:09:43:17 -0500] "GET /images/index1.gif HTTP/1.0" 200 16633
sweaver.pr.mcs.net - - [04/Sep/1996:09:43:43 -0500] "GET / HTTP/1.0" 200 3045
www-m0.proxy.aol.com - - [04/Sep/1996:10:13:46 -0500] "GET / HTTP/1.0" 200 3045
www-m0.proxy.aol.com - - [04/Sep/1996:10:13:51 -0500] "GET /images/index1.gif HTTP/1.0" 200 16633
www-m0.proxy.aol.com - - [04/Sep/1996:10:14:45 -0500] "GET /index.htm HTTP/1.0" 200 3045
```

```
www-m0.proxy.aol.com - - [04/Sep/1996:10:16:11 -0500] "GET /corpinfo.htm HTTP/1.0" 302 -
www-m0.proxy.aol.com - - [04/Sep/1996:10:16:14 -0500] "GET /select1.pl HTTP/1.0" 200 2199
www-m0.proxy.aol.com - - [04/Sep/1996:10:17:11 -0500] "GET /careers.htm HTTP/1.0" 304 -
ns.infores.com - - [04/Sep/1996:10:17:12 -0500] "GET / HTTP/1.0" 200 3045
ns.infores.com - - [04/Sep/1996:10:17:25 -0500] "GET /images/index1.gif HTTP/1.0" 200 16633
ns.infores.com - - [04/Sep/1996:10:17:55 -0500] "GET /careers.htm HTTP/1.0" 200 9251
www-m0.proxy.aol.com - - [04/Sep/1996:10:18:32 -0500] "GET /dvlpclnt.htm HTTP/1.0" 302 -
www-m0.proxy.aol.com - - [04/Sep/1996:10:18:35 -0500] "GET /select2.pl HTTP/1.0" 200 3680
ns.infores.com - - [04/Sep/1996:10:18:39 -0500] "GET /corpinfo.htm HTTP/1.0" 302 -
ns.infores.com - - [04/Sep/1996:10:18:40 -0500] "GET /select1.pl HTTP/1.0" 200 2272
ns.infores.com - - [04/Sep/1996:10:19:09 -0500] "GET /index.htm HTTP/1.0" 200 3045
ns.infores.com - - [04/Sep/1996:10:19:40 -0500] "GET /partners.htm HTTP/1.0" 200 1655
www-m0.proxy.aol.com - - [04/Sep/1996:10:19:48 -0500] "GET /partners.htm HTTP/1.0" 304 -
ns.infores.com - - [04/Sep/1996:10:19:56] "GET /dvlpclnt.htm HTTP/1.0" 302 -
ns.infores.com - - [04/Sep/1996:10:19:57] "GET /select2.pl HTTP/1.0" 200 2114
www.m0proxy.aol.com - - [04/Sep/1996:10:20:58 -0500] "GET /corpinfo.htm HTTP/1.0" 302 -
lars.cooltech.com - - [04/Sep/1996:11:29:17 -0500] "GET / HTTP/1.0" 200 3045
```

Number of Requests Per Filename

| File Name (URI) | Number of Requests |
|---|---|
| / | 63 |
| /careers.htm | 18 |
| /cgiemail.cgi/netroi/careers.tmp | 1 |
| /cgiemail.cgi/netroi/sendinfo.tmp | 3 |
| /corpalt1.htm | 1 |
| /corpinfo.htm | 34 |
| /dvlpclnt.htm | 21 |
| /netroi/summary1.pl | 1 |
| /partners.htm | 19 |
| /private/objctvs.htm | 4 |
| /response.htm | 2 |
| /select1.pl | 55 |
| /select2.pl | 18 |
| /sendinfo.htm | 7 |
| /showinfo.pl | 3 |
| /summary1.pl | 3 |
| /summary2.pl | 1 |
| /target1.pl?1 | 2 |
| /target1.pl?2 | 1 |
| /target1.pl?3 | 1 |
| /target1.pl?4 | 1 |
| /thanks.htm | 4 |

PROCESS FOR OPTIMIZING THE EFFECTIVENESS OF A HYPERTEXT ELEMENT

LIMITED COPYRIGHT WAIVER

A portion of this patent document contains material in which a claim of copyright protection is made. The copyright owner has no objection to the reproduction of the patent document for review as it appears in the files and records of the U.S. Patent and Trademark Office, but reserves all other rights.

BACKGROUND OF THE INVENTION

1. Field of the Invention

The present invention relates to a process for optimizing the effectiveness of a hypertext document or content variable (hereinafter, "hypertext element"), and, more particularly, to a process for analyzing specific hypertext elements of a document in Hyper Text Mark-up Language (HTML), either static or dynamic, which automatically redirects links to the hypertext elements to a plurality of alternate hypertext elements configured in effective parallel paths (i.e. rotated between alternative elements) according to a predetermined distribution function in order to analyze the manner in which visitors to a web site respond to links to each of the alternate hypertext elements so that the most effective alternate can be determined in order to improve the overall effectiveness of the hypertext element.

2. Description of the Prior Art

The worldwide web is becoming an increasingly popular means for communication over the Internet. Home pages, or web sites, are used for various purposes, including advertising and selling products. Such web sites or home pages are formed from hypertext documents created by Hyper Text Mark-up Language (HTML). In their simplest form, hypertext documents can be a page of text with certain words or phrases, known as hyperlinks or links, highlighted, for example, by underlining or the use of different colors, or both. When a visitor to the web site clicks a mouse pointer on a hyperlink, control is transferred to a different hypertext document to which the hyperlink is connected in order to enable the visitor to the web site to browse through a continuing series of documents or document pages of interest. Hypertext documents are not limited to text documents, but can also be complex multimedia documents which contain graphics, pictures, sound or video objects or other hot spots. A hot spot is a general term for the various places or locations on the document page that are linked to another document or which trigger an audio or video clip or some other action. Graphics and pictures are inserted into hypertext documents in the same way that a word or phrase is linked between documents as discussed above. A sound or video object, in the form of a recording of a sound or video, can be electronically inserted into the document, denoted by a label or icon, which appears as a hyperlink. When a mouse pointer is clicked on the icon, rather than being transferred to a new document or document page, a sound or video clip is played in a small window that automatically opens up in the document.

Both static or dynamic web sites are known. Static web sites are simply static files that are used to create a home page on demand. Dynamic web sites are created on the fly generally from information stored in a database or by other methods which generate web pages and content in real time according to the behavior and known characteristics of the user.

The web sites, also known as home pages, may be created from various word processing documents spread sheets, presentation packages and the like using available application programs which convert the word processing documents into hypertext documents compatible with HTML. Microsoft's "FRONT PAGE" software is an example of available software for creating web sites.

Hundreds and even thousands of web sites can be run by a web server. Each of the web sites may consist of any number of web pages and/or can even consist of a single hypertext document and one or more succeeding linked documents. The cost for maintaining a web site on a particular web server is based on various factors including: the particular disk storage space for the web site and/or web page, computer processing requirements, costs associated with designing and constructing pages in the web sites, costs of technical maintenance of the web site and the required hardware and software, costs to purchase the required hardware and software to operate the web site and other costs associated with building and operating the web site.

Each web site may have one or more objectives. In order for the web site to be successful, the objectives of the web site and/or web pages within the web site must be fulfilled. Various objectives are known for such web sites, including: acquiring visitor profiles or registrations and/or other information; downloading or distributing software; displaying text and graphics; selling products and services; distributing information, as well as advertising. A measure of the effectiveness of a web site can be determined by the number of compliances with the objective. As used herein, compliance is defined as the successful achievement of the desired behavior, whether it be purchasing products or services or downloading information or any of the other objectives mentioned above or any other outcome which the website is intended to produce among visitors. Since each access to a web site and succeeding hypertext document is logged by the web server, the success or compliance with the business objective can be measured by analyzing the server log file maintained by the web server or through other measurement methods whereby the visitor's compliance with the intention of the website can be assessed, including externally collected survey information.

An exemplary map of a web site or home page is illustrated in FIG. 1. The home page is illustrated to the left, with links to various other hypertext documents moving from left to right. In order to simplify the discussion, as well as the illustration, the server is shown with a single hypertext home page and assumes only one source of entry for each hypertext document. However, as will be apparent to those of ordinary skill in the art, the discussion equally follows to more complex structures.

As shown in FIG. 1, the exemplary home page is linked to four hypertext documents A, B, C and D. Each of the hypertext documents A, B, C and D contain successive links to other hypertext documents as well as a link to another web site, as indicated by the hyperlinks E and X, which represent advertising links from a particular web site to another web site. The hypertext document T represents the page where the product is sold. Thus, with respect to the exemplary map illustrated in FIG. 1, access to the hypertext documents E, T and X may represent compliances with the business objectives. The other hypertext documents or pages may contribute to the web site as a whole, but do not directly fulfill the business objective for the web site.

Compliance generally requires two things: First, a visitor must actually visit a web page, called the target page, where the visitor is provided with the opportunity to perform the compliance. Second, the compliance must be executed (i.e. the desired action must be performed). See the following examples:

Example 1

The objective of the web site is to sell merchandise. The compliance is that the visitor orders merchandise. In order to do this, the visitor must visit the page on the site where orders are submitted, or the target page.

Example 2

The objective of the website is to inform visitors of the health benefits for a particular cereal and distribute coupons for that cereal. The compliance is that the visitor reads or downloads the information and coupons from the target page or pages which contain it.

Example 3

The objective of the website is to acquire consumer profiles through registrations. The compliance is that the visitor registers the appropriate information with the vendor, and the target page is where the registration form is located.

Various factors affect whether the visitors to the home page choose to pass through the various links to the hypertext documents E, T and X, which, as discussed above, represent compliances with the business objective. Examples of such factors include: speed at which the home page downloads; the graphical design and aesthetics of the home page; the creative positioning and strategy of the home page; the material and information content of the home page; the specific nature and location of the hot links on the home page; the speed at which the linked pages download; the graphical design and esthetics of the link pages; the creative positioning and strategy of the linked pages; the material and information content of the linked pages; the specific nature and location of the hot links on the linked pages, as well as the pricing, promotional and advertising information regarding the vendor's products. There are various trade-offs in the factors identified above. For example, more complex graphics may take relatively longer to download, but may be more aesthetically pleasing to the visitor. The download time for each of the hyperlink documents has a definite effect on the attrition rate at each of the links.

FIG. 2 represents an exemplary number of accesses to successive links from the home page, assuming 100 visitors initially visited the home page. As shown, for every 100 visitors to the home page, only 70 move on, for an attrition rate of 30%. Of the 70, only 9 comply with the particular business objectives of the site [i.e., 4 move on to link E, while 5 move on to page T for a total of a nine percent success rate for every 100 visitors to the home page.

As can be seen from the above example, the number of compliances relates directly to the return on investment. Since the proprietor of the home page pays according to the amount of disk space and other costs associated with the creation, operation and maintenance of the web server, the return on investment for this cost can be improved by improving the number and/or percentage of compliances.

SUMMARY OF THE INVENTION

It is an object of the present invention to improve the effectiveness and return on investment (ROI) of a web site.

It is yet another object of the present invention to provide a process for analyzing links in a web site in order to optimize those links and provide maximum effectiveness for the web site.

Briefly, the present invention relates to a process for optimizing the effectiveness of a web site or web page. In particular, various hypertext variables of hypertext documents in Hyper Text Mark-up Language (HTML) (hypertext elements) are analyzed to identify weak (i.e. low traffic, for example) links in order to improve compliances with the business objective for the web site or web page. A plurality of alternate hypertext elements are created and placed in effective parallel paths by sequential rotation relative to the original hypertext document according to a predetermined distribution pattern, for example, sequential, equal distribution or random distribution. Accesses to the web site are redirected to the alternate hypertext elements transparently. Access logs or other sources of measurement for each of the alternate hypertext elements are analyzed to determine the most effective alternative hypertext element, according to predetermined criteria. The most effective hypertext element is then substituted for the original hypertext element in order to improve the effectiveness of the web site.

BRIEF DESCRIPTION OF THE DRAWING

These and other objects of the present invention will be readily understood with reference to the following specification and attached drawing, wherein:

FIGS. 15–20 are exemplary pages for the web site illustrated in FIG. 14.

FIG. 21A is an exemplary web server log file.

FIG. 21B is an exemplary output of a log analysis of server request log for a web site server.

DETAILED DESCRIPTION OF THE INVENTION

Figure 14:
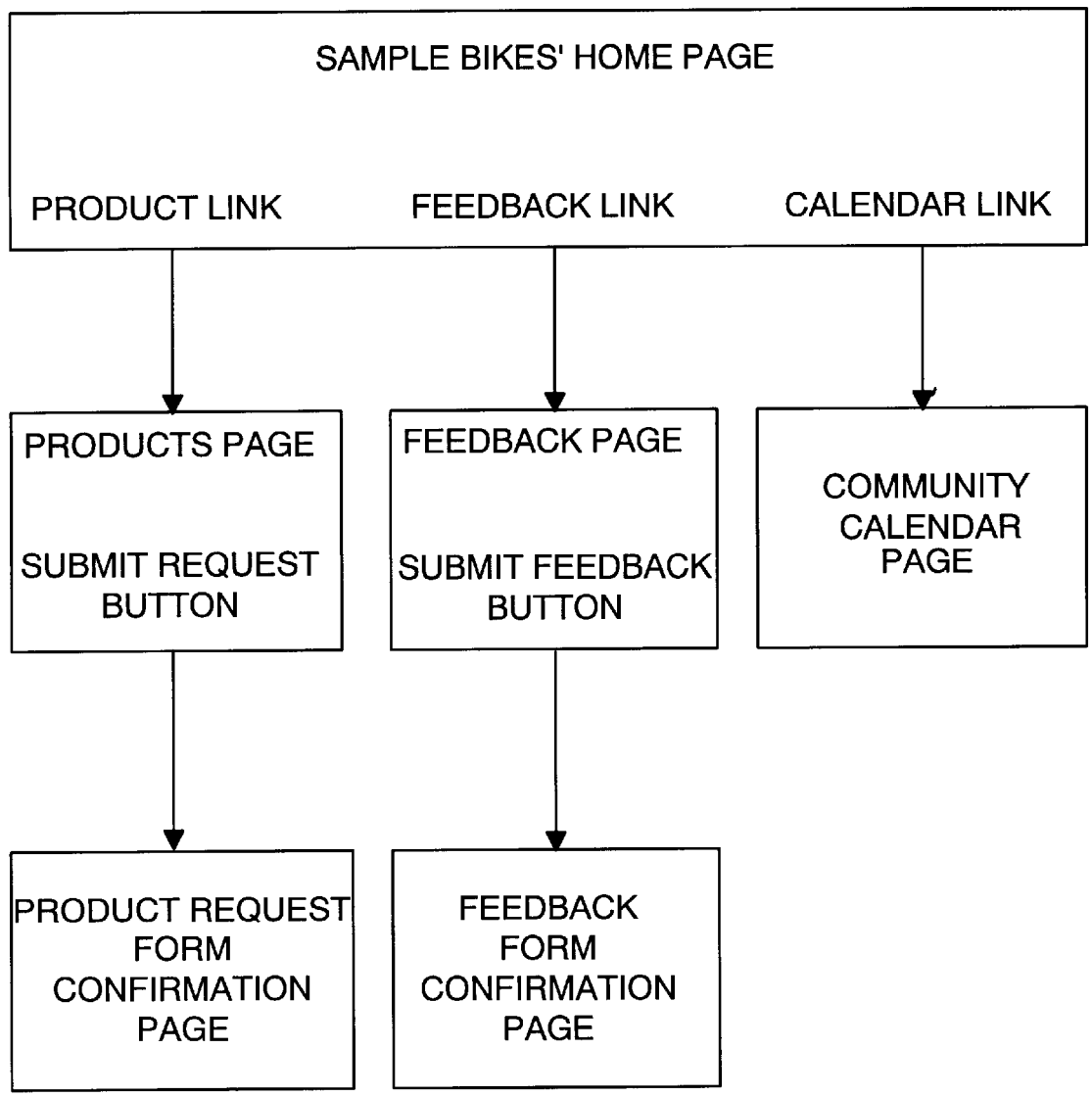
FIG. 14 is a map of an exemplary web site.
Figure 15:
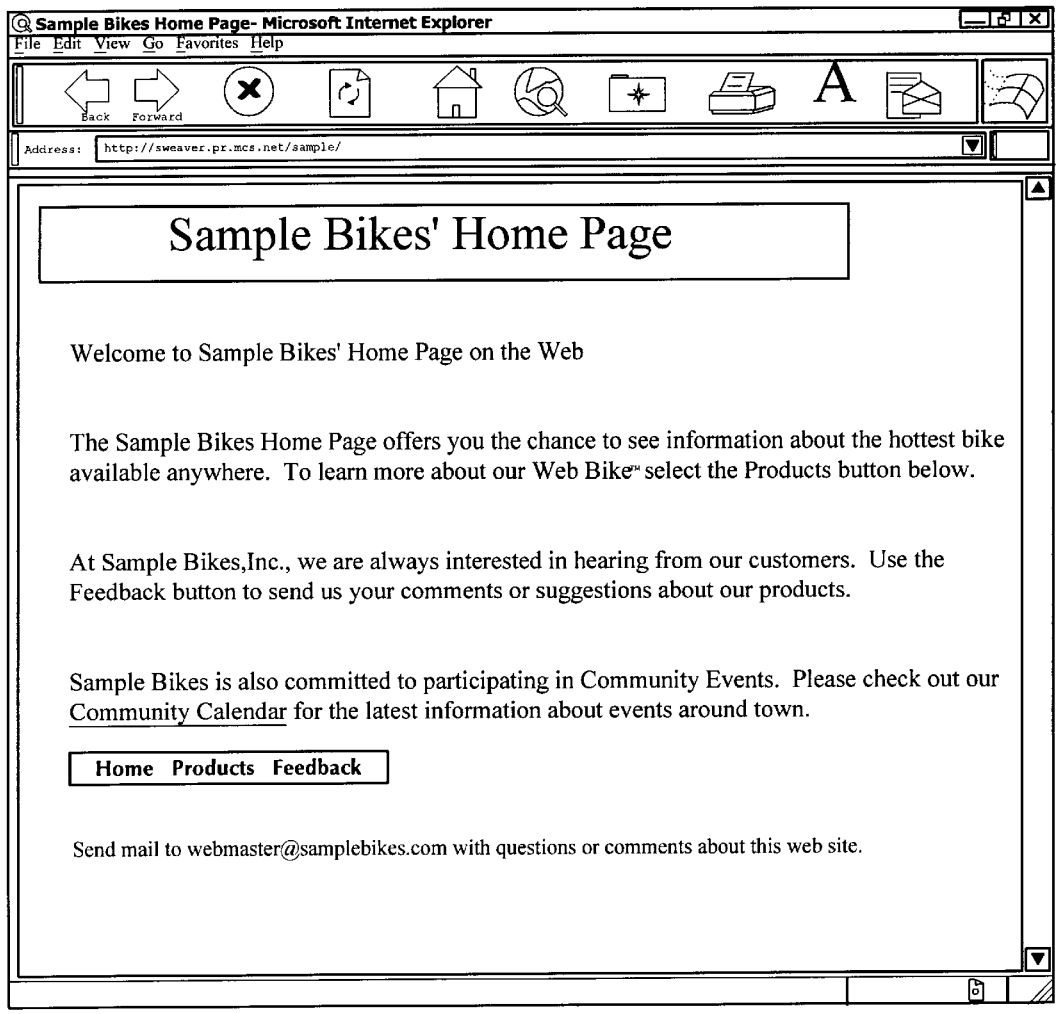
Figure 17:
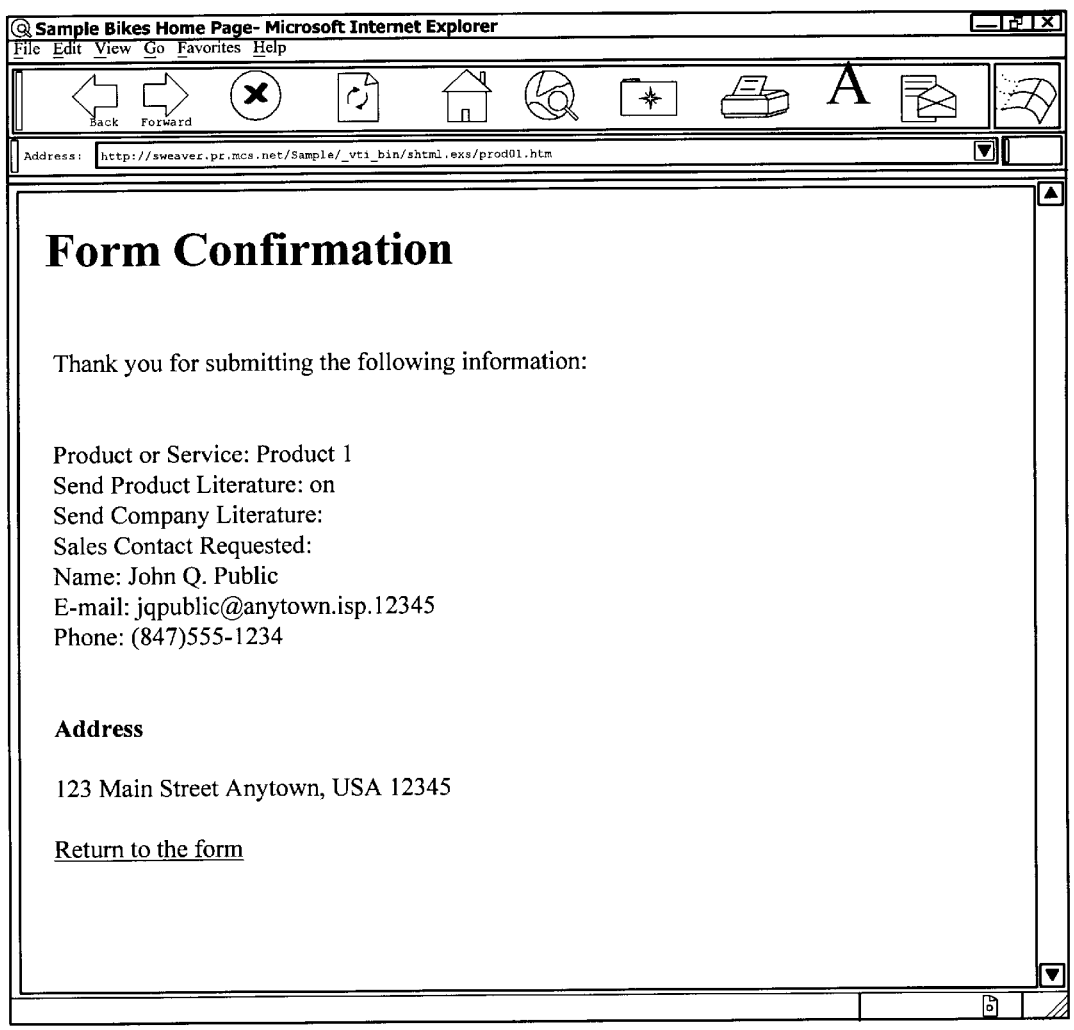
Figure 20:
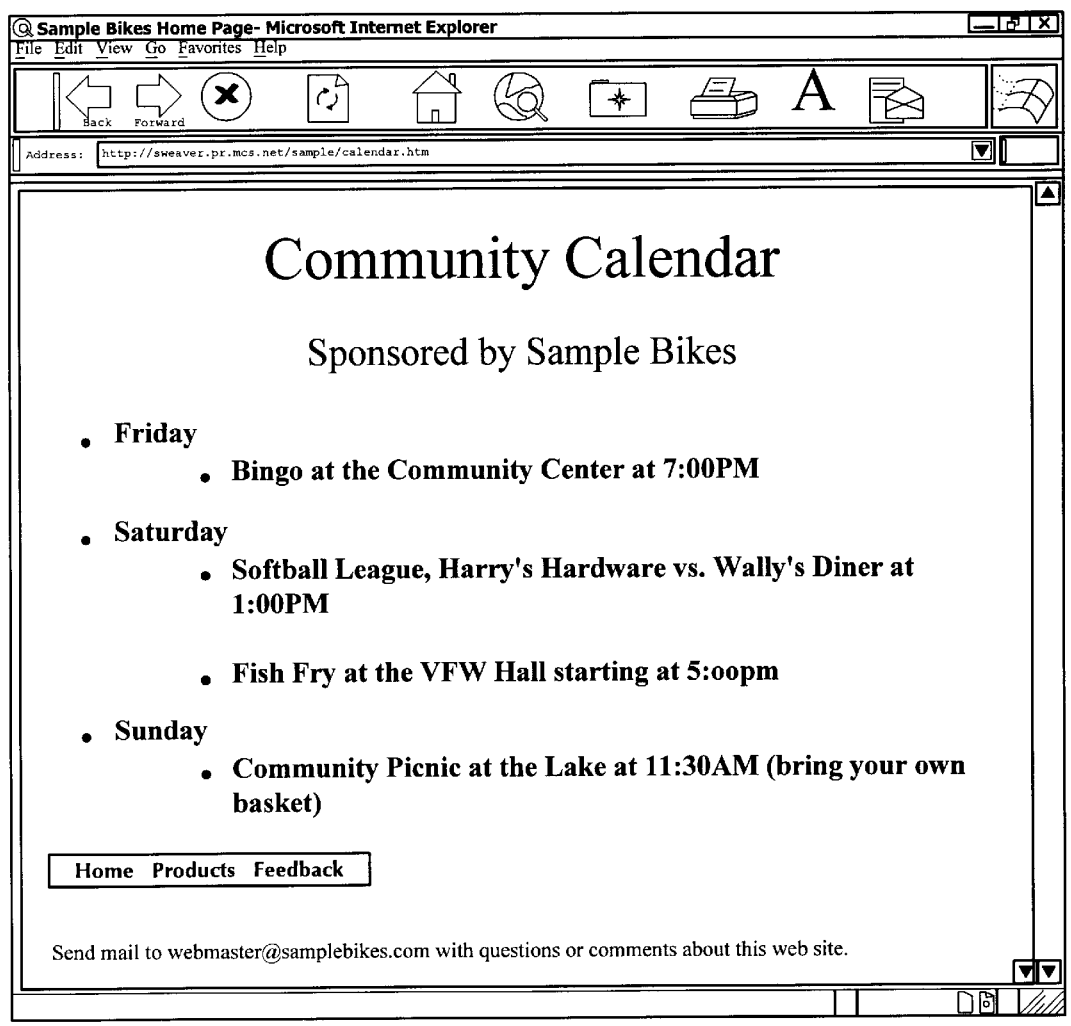

FIGS. 14–20 represent an exemplary web site with multiple objectives. Referring to FIG. 14, a map for an exemplary web site is illustrated with three (3) objectives: (1) receive product information request; (2) receive customer feedback; and (3) provide a community service through an events calendar. FIG. 15 represents an exemplary home page. The home page includes three hyperlinks (COMMUNITY CALENDAR, PRODUCTS, FEEDBACK) for each of the three objectives identified above. The PRODUCTS hyperlink links the home page to an alternative page and, in particular, to a products page illustrated in FIG. 16, wherein the visitor can request product information for a particular product by inserting information regarding name, title, company, address, phone number and E-mail address. Once the information is inserted, clicking the mouse cursor on the SUBMIT REQUEST hyperlink will link the visitor to a Form Confirmation page as illustrated in FIG. 17. The Form Confirmation page provides confirmation to the visitor to the site that the product information has been properly requested. FIG. 18 is a page that is linked to the home page illustrated in FIG. 15, that is selected when the FEEDBACK link is selected on the home page. FIG. 19 is a Form Confirmation page which provides feedback information in accordance with an objective for the site. Lastly, the COMMUNITY CALENDAR link provides a link to a community calendar page illustrated in FIG. 20 which provides a calendar of local events in accordance with another objective of the home page.

The present invention relates to a process for optimizing the effectiveness of a web site. The process consists of a plurality of steps, as will be discussed below, some of which may be conducted off-line, while others may be conducted on-line. For the steps that are conducted on-line, the software for such on-line steps is ideally stored on the web server which operates the web site of interest.

The process may be broken down to eight (8) basic steps as set forth below:

(1) define and prioritized web site objectives;
(2) specify target pages and compliances for each objective;
(3) conduct log analysis;
(4) identify and prioritized test opportunities;
(5) design tests for each opportunity;
(6) conduct tests;
(7) implement improved alternative;
(8) repeat process.

Figure 3:
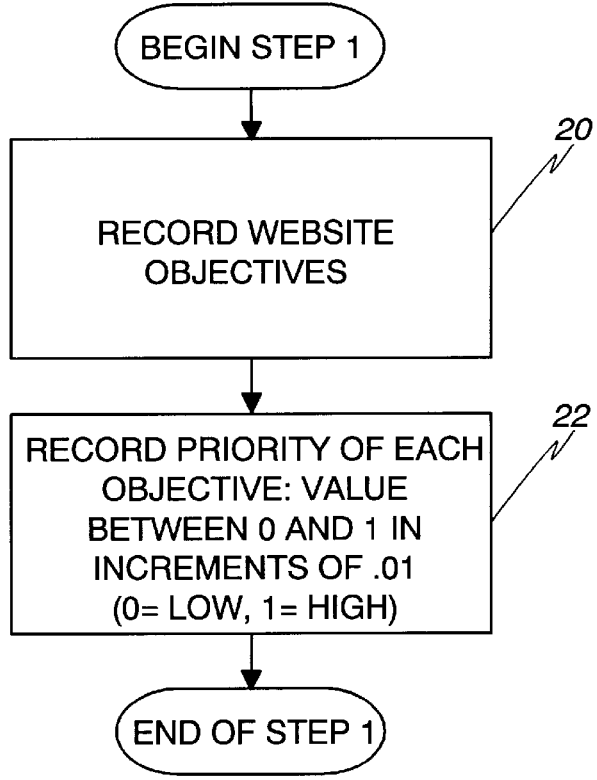
FIGS. 3–13 represent the process steps for maximizing a web site in accordance with the present invention.

These eight steps are illustrated in FIGS. 3–13. Referring to FIG. 3, the start of the process relates to defining and prioritizing web site objectives. The first step in the process is to define and prioritize web site objectives, a step that may be conducted off-line. More particular, referring to FIG. 3, initially, in step 20, the web site objectives are recorded. For the example illustrated in FIGS. 14–20, the objectives are as follows:

(1) receive product information requests;
(2) receive customer feedback;
(3) provide a service to the community through an events calendar.

Once the objectives of the web site are defined, each of the objectives for the particular web site are prioritized in step 22, for example, with a priority between zero (0) and one (1), with zero being the lowest and one being the highest. For the example above, receiving product information requests may be considered a high priority, while receiving customer feedback may be considered a medium priority, while providing a service to the community may be a low priority.

Figure 4:
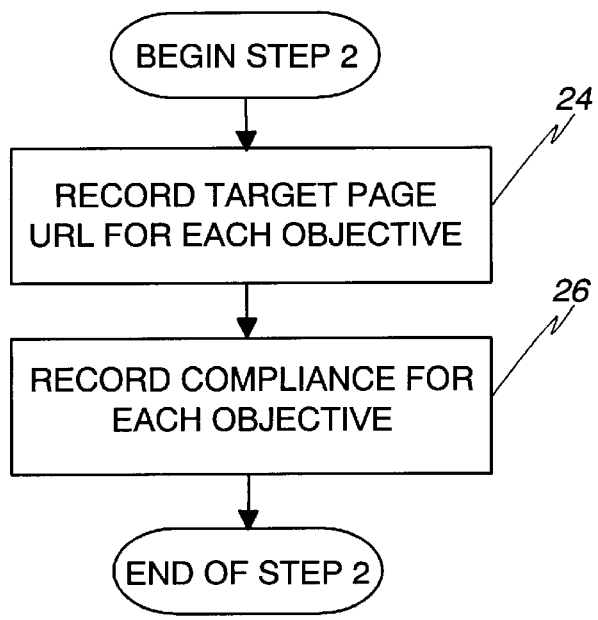

After the web site objectives are defined and prioritized, the second major step in the process, as illustrated in FIG. 4, is to specify the target page and compliance for each objective, which may be another off-line step. This step is illustrated in FIG. 4 and discussed herewith with respect to the example illustrated in FIGS. 14–20. Initially, the target page and address or universal resource locator (URL i.e., http://www. domainname.com/filename.html/) for each objective is recorded in step 24. In addition to recording the target page and URL for each objective, the compliance for each objective is recorded in step 26. Utilizing the example illustrated in FIGS. 14–20, the target page and associated compliance for each objective made would be as follows:

Obj. 1
Target Page: The Product Page.
Compliance: Click on the Submit Request Button that links to the Product Form Confirmation Page.
Obj. 2
Target Page: Feedback Page.
Compliance: Click on the Submit Request Button that links to the Feedback Form Confirmation Page.
Obj. 3
Target Page: The Home Page
Compliance: Click on the hypertext link to the Community Calendar Page.

As mentioned above, the URL for each of the target pages is recorded for each of the target pages. Each of the URL's would have the general form http://www.domainname.com/filename.html/.

Figure 1:
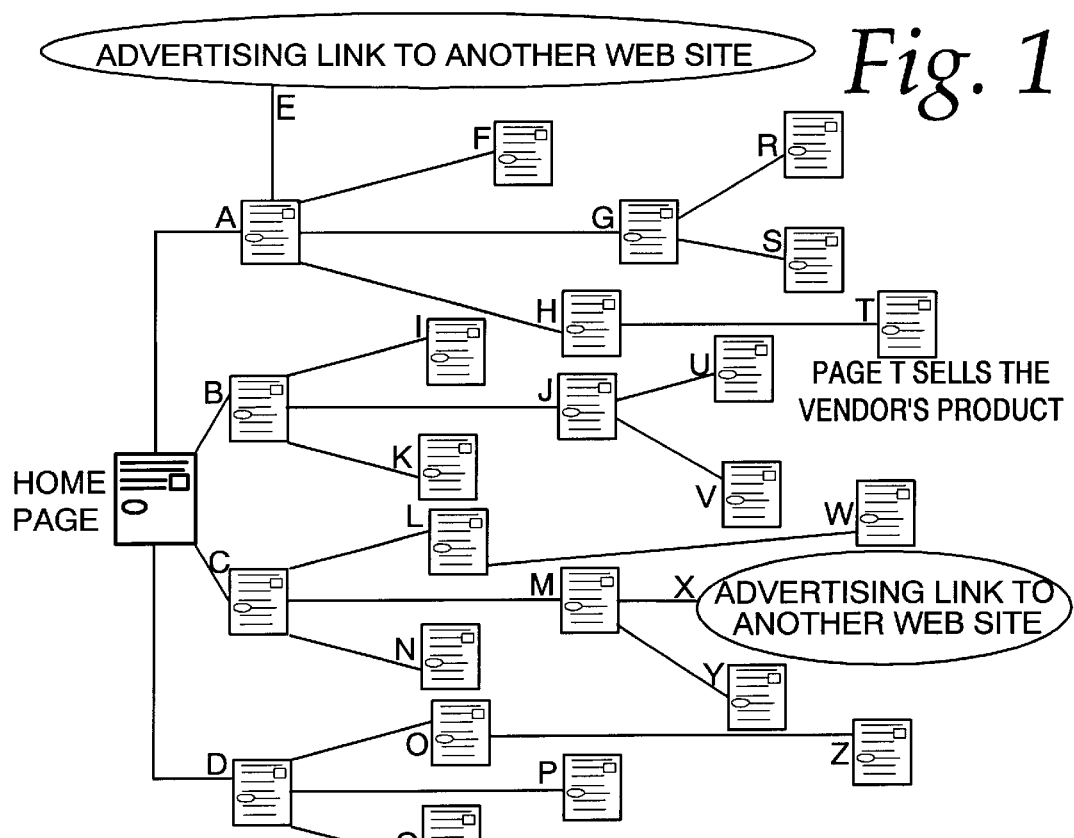
FIG. 1 is a map or link diagram of various hypertext documents on an exemplary web site.
Figure 2:
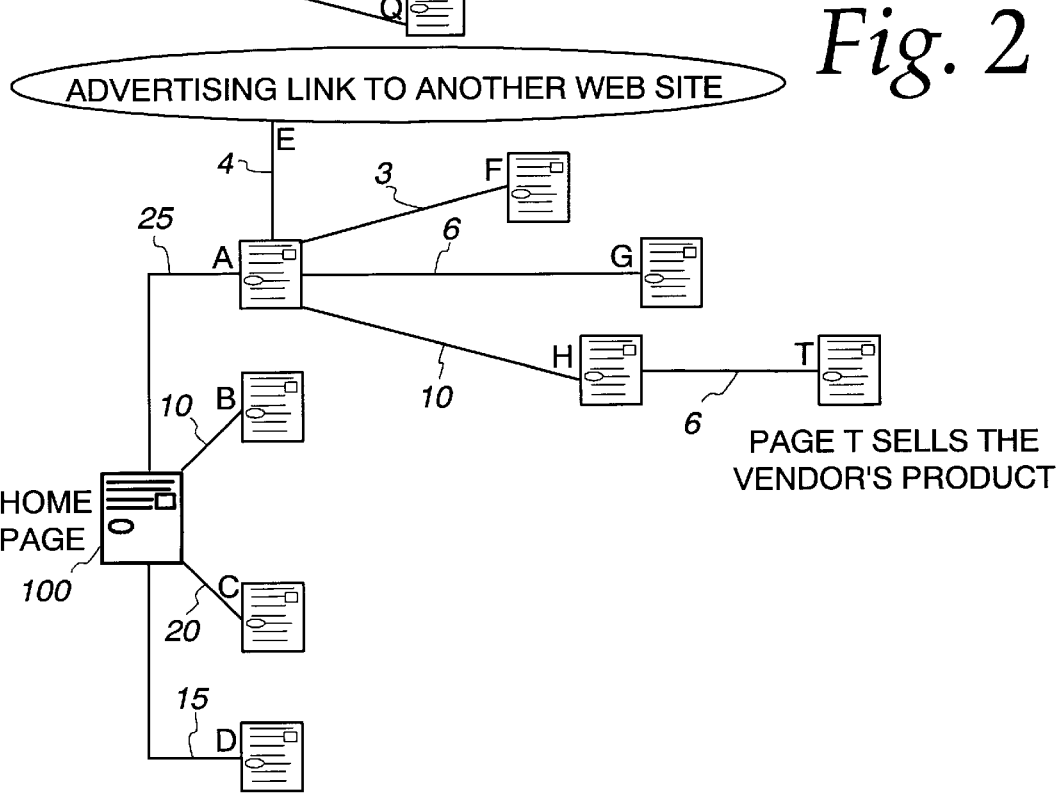
FIG. 2 is an abbreviated version of the map illustrated in FIG. 1 shown with an exemplary number of visitors to various successive links to the home page.
Figure 5:
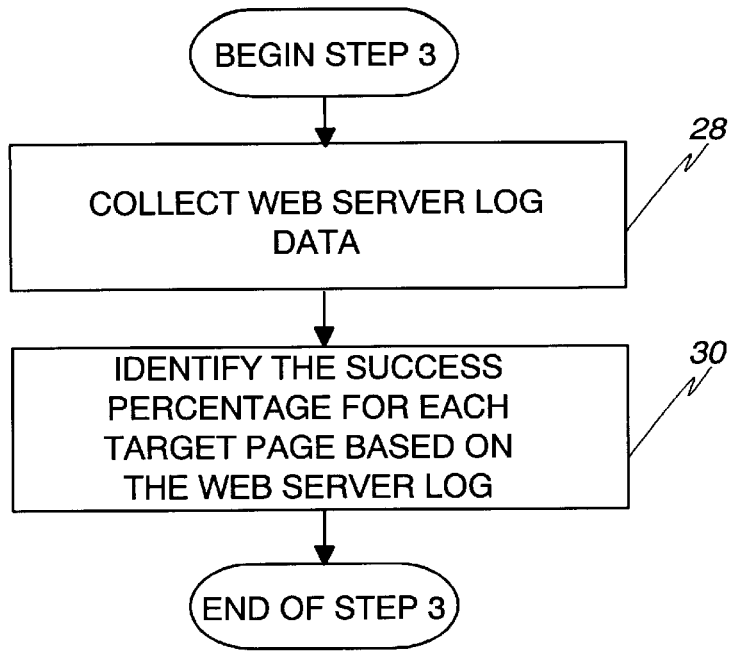

Step 3 of the process in accordance with the present invention relates to conducting a web server log analysis as illustrated in FIG. 5. Step 3 of the process may be an off-line process but may be conducted by available server log analysis software, for example, Market Focus ™ 2 Standard Edition Version 2.0. 902 by Interse Corporation. As mentioned above, a map of the web site is first provided, for example, as illustrated in FIG. 2, illustrating the home page and all successive pages in the web site. The web site server log provides the number of visits for each link in the web site. An exemplary web server log file is illustrated in FIG. 21A while FIG. 21B represents an exemplary output of a log analysis program. As shown, the web server log file identifies each request for a file on the web server. The web server log is then input into the log analysis software program, as discussed above. Since the web server log files are on the web server, the log analysis software is preferably run on the web server itself. Thus, in step 28, as illustrated in FIG. 5, the web server log data is collected. Once the web server log data is collected, the success percentage for each target page based on the web server log data may be computed in step 30. The output of the log analysis is used to sort out all the data in the web server log file and identify the number of requests for target pages and compliance links, as desired. This data is also used to identify critical parts and links between the site entry and the target pages such that weak or leverage points in the structure of the website can be identified. The data can also be used to identify the relationship between an improvement at each point along the path and the number of visitors reaching the target page. This information is used to determine the percentage of success for each target page.

Figure 6:
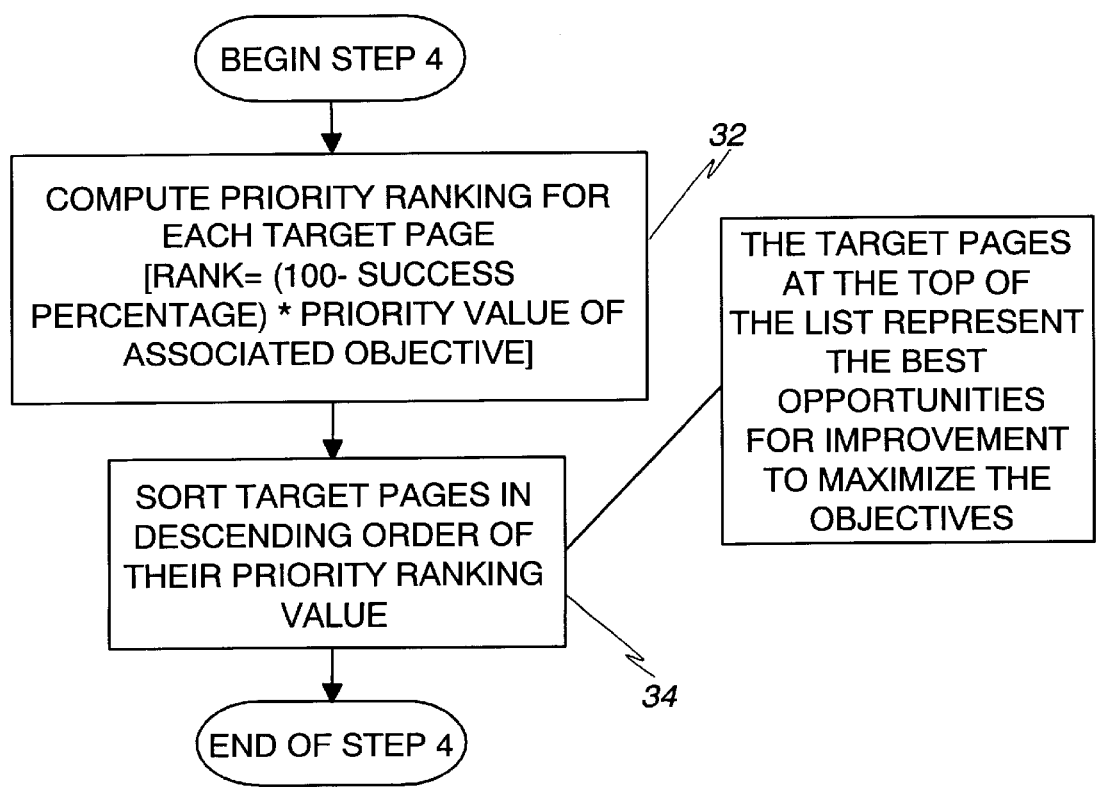

Step 4 of the process, which may be an off-line step, in accordance with the present invention, is illustrated in FIG. 6. Once the number of requests per page in the web site is known, the data is analyzed to determine where improvements in the effectiveness of the web site can be made. Various methods may be used for analyzing attrition at various stages along the path to a target page on a web site. For example, as illustrated in step 32 in FIG. 6, a priority ranking may be computed for each target page, according to a formula as follows:

Rank=(100−success percentage*priority value of associated objectives)

This computation may be performed for each objective. Utilizing the example illustrated in FIGS. 14–20, three computations can be performed, one for each of the target pages identified. After the computations are made for each of the objectives, the target pages may be sorted in descending order of their priority ranking value in step 34. Once the target pages are sorted, the target pages at the top of the list will be indicative of the best opportunities for improvement to maximize the objectives for each of the target pages identified.

Figure 7:
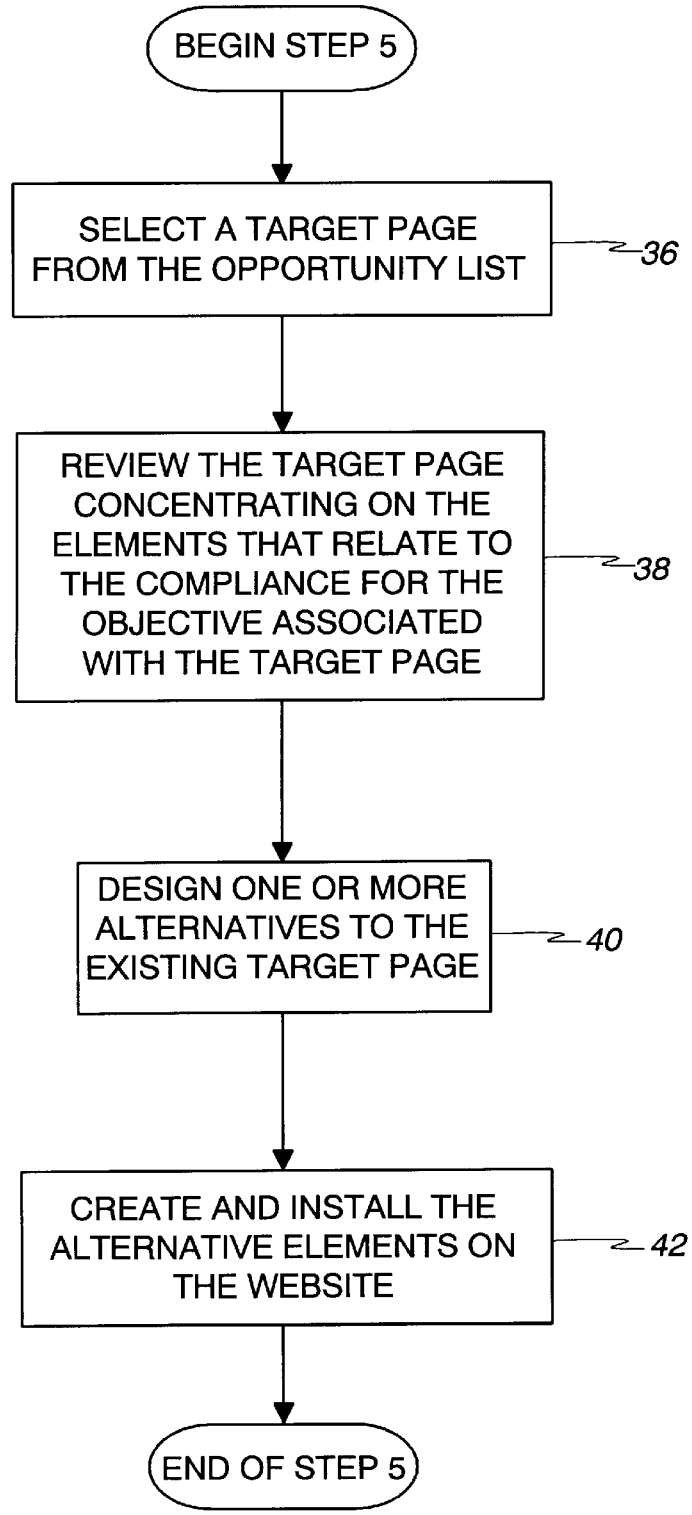

Once the best opportunities are identified, a test for each opportunity is conducted in step 5 of the process, as illustrated in FIG. 7. It should be understood that step 5 of the process can be repeated for any number of pages. It is assumed that the target pages will be optimized according to their priority ranking, as discussed above, in connection with step 4. However, step 5 of the process in accordance with the present invention can be repeated for virtually all pages in the system.

Referring to FIG. 7, a target page is selected for testing in step 36. As mentioned above, the target pages may initially be selected according to the priority identified in step 4 of the process or through some other process. Once a target page is selected for testing, the target page is reviewed in step 38 to determine the elements on the target page that relate to a compliance with the stated objective for the target page. Using the example illustrated in FIGS. 14–20, the compliance may relate to visiting a target page and requesting product information or downloading information regarding community events.

Figure 22:
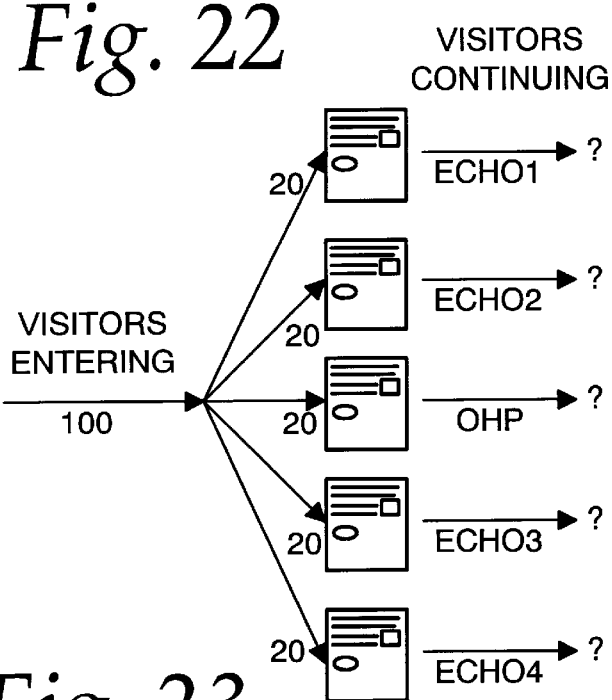
FIG. 22 is a block diagram illustrating a plurality of echo pages in parallel paths with the original home page in accordance with the present invention.

Once the target page is reviewed, one or more alternatives to the existing target page or elements or portions thereof are designed in step 40. In particular, alternative or echo pages are designed. These alternative or echo pages may be done off-line with the help of various application softwares such as Microsoft's Front Page software, for example, as illustrated in FIG. 22. As illustrated in FIG. 22, four alternates to the original home page are created in step 40, identified in FIG. 22 and installed on the web site. The four alternates are identified as ECHO1, ECHO2, ECHO3 and ECHO4.

Figure 8:
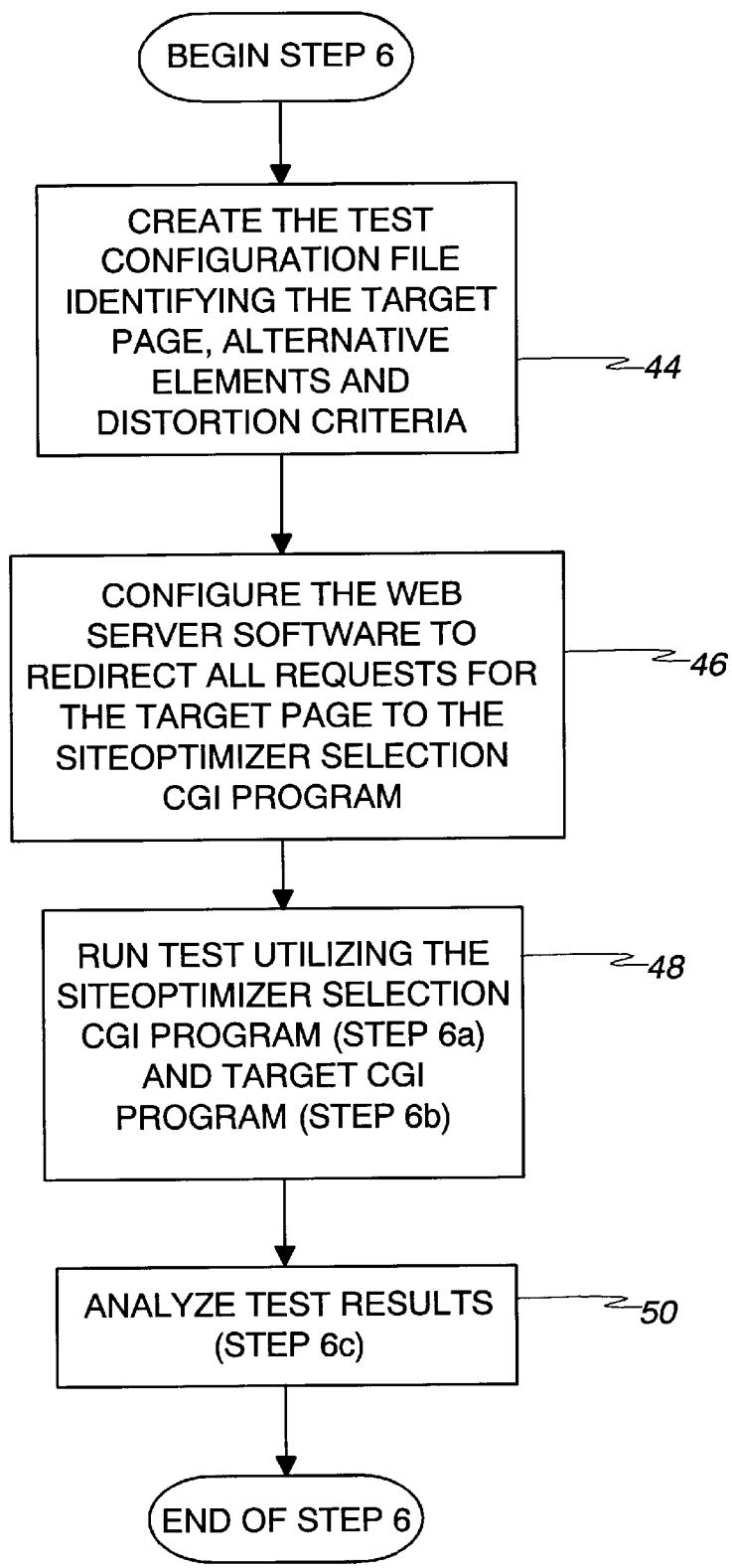

On-line tests are then conducted in step 6 of the process as illustrated in FIG. 8. In particular, as will be discussed in more detail below, using the example illustrated in FIG. 22, the 100 visitors to the home page are automatically distributed to the original home page (OHP), as well as the echo pages, according to a distribution function in step 44. Various distribution functions are possible. As illustrated in FIG. 22, the visitors to the home page are equally distributed. However, other distribution criteria, such as sequential or random, could also be used. Distribution can also be based upon available information, such as visitors' software, characteristics or prior behavior. After the test is configured, the web server software is configured in step 46 to redirect all requests for the target page or original home page to the original home page as well as the alternate pages as illustrated in FIG. 22, for example.

Figure 23:
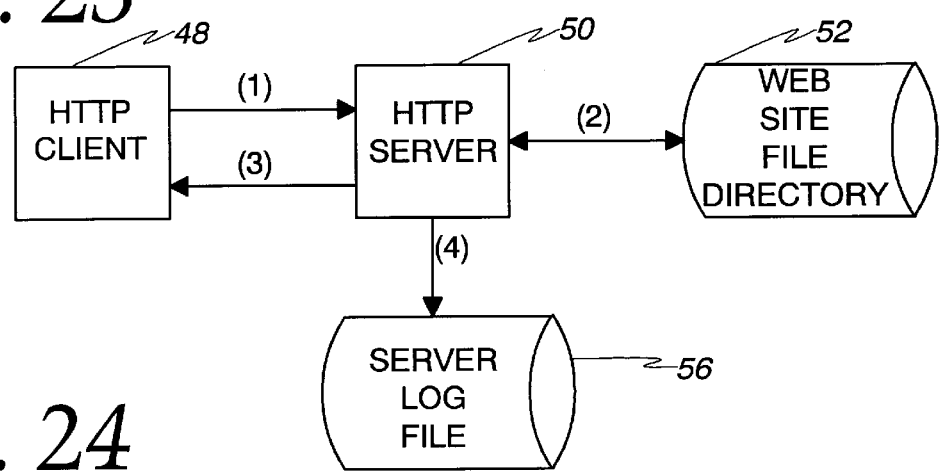
FIG. 23 is a block diagram which illustrates how a conventional web site server generates static web pages in response to client request.
Figure 24:
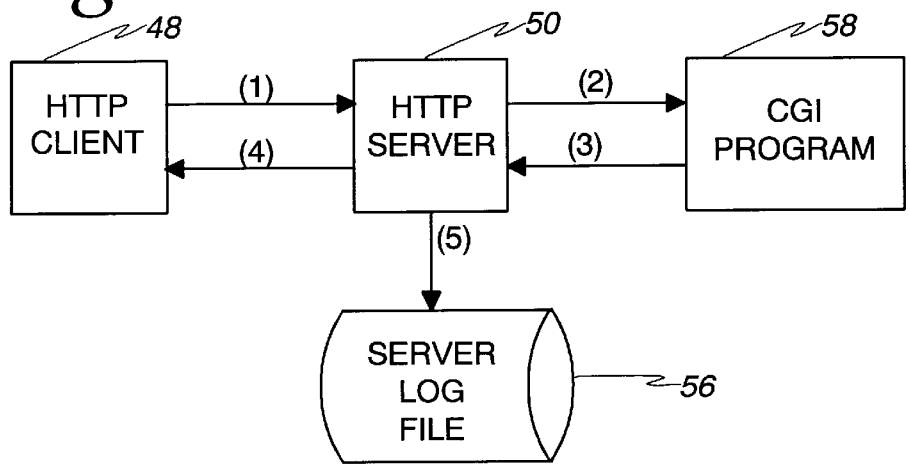
FIG. 24 is similar to FIG. 24, but for a dynamic web page.

FIG. 23 illustrates the process for serving a static web page, while FIG. 24 illustrates the process for serving a dynamic web page. Referring first to FIG. 23, a personal computer (PC), identified as an http client, is shown connected to a web server by way of the Internet. Visits to a home page are accomplished by the client transmitting the URL of the home page to the web server 50, as indicated by the line (1). Upon receipt of the URL for the home page, the server reads the contents of the home page from a web site File Directory 52, as indicated by line (2). The text file is then returned to the client 48 as indicated by line (3). Subsequently, the web server 50 logs the request to its server log file 56 as illustrated by line (4).

FIG. 24 illustrates the process for accessing a dynamic web page. The process is very similar to the static page example except that the dynamic web page may be generated by a common gateway interface (CGI) program stored on the web server 50 or other methodology for generating web pages on the fly in real time. Initially, the client 48 requests the dynamic home page by sending the URL to the web site server 50 as indicated by the line (1). In this case, the URL is the address of a CGI program on the server 50. The server 50, in turn, executes the requested CGI program identified with the block 58, which, in turn, creates the contents of the web page, which are returned to the client. In particular, the server 50 passes all parameters to the CGI program 58. The CGI program creates the contents of the web page and passes it back to the server 50 as illustrated by the line (3). The content is returned to the client 48 as indicated by the line (4), after which the request is logged in the Server Log File 56 as indicated by the line (5).

Figure 25:
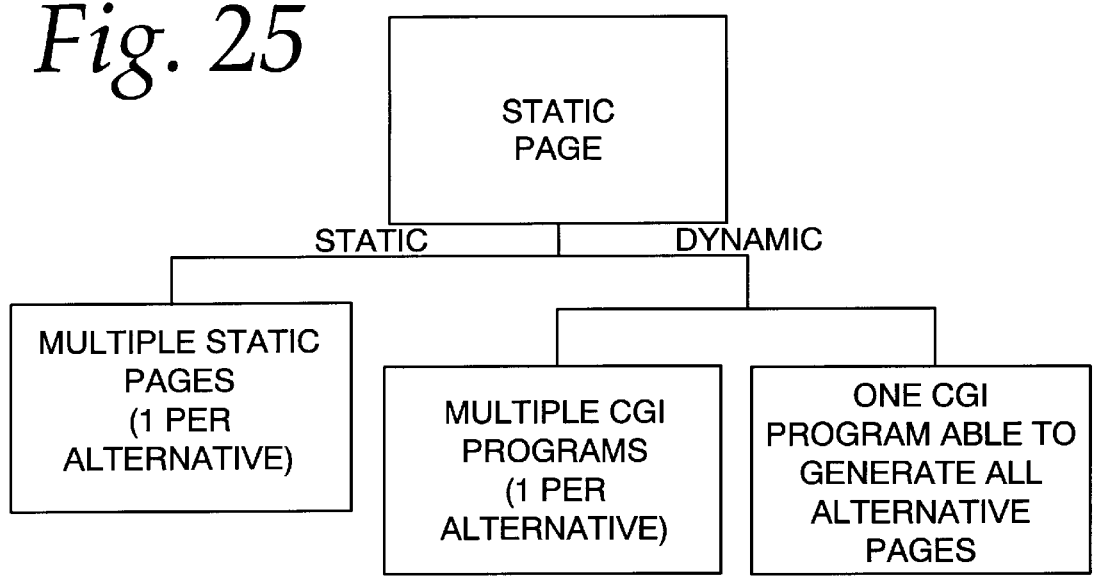
FIG. 25 is a block diagram illustrating various methods for creating alternate web pages in accordance with the present invention.

In accordance with the present invention, tests on alternative or echo pages are implemented. Referring to FIG. 25, alternative static web pages can be created in different ways. For example, for each alternative page, a static text file can be created. Alternately, multiple CGI programs can be utilized, each capable of generating one of the alternate pages. A single CGI program is also contemplated, capable of generating all of the alternate pages. Dynamic web pages can be handled in much the same manner as the static pages by modifying, for example, a program that is used to generate the current page to also generate alternative pages.

Referring back to FIG. 8, a test configuration file is created is step 44, identifying the target page, alternative elements and distribution criteria. Subsequently, the web server is then reconfigured to redirect all requests for the target page to a site optimizer CGI program, for example, in step 46. Redirection is a commonly known method used on the Worldwide Web for the server or a CGI program to respond to a request for a particular URL when a requested page is not available. In such a situation, the server or CGI program returns a URL for a different page. The client then reissues its request with the new URL. In the case of the present invention, the URL for the site optimizer CGI selection program 60 for creating on alternative page is included in the response from the server back to the client. In this way, the existing test page is transparently replaced with an alternative page without any modification of the URL used by the visitor to access the test page.

Alternate to the site optimizer CGI program discussed above, various alternate site optimizer programs are also contemplated, such as a plug-in program using a web server application programming interface (API), Server Side Include programming and Third Party Web Server Extension programs. Web server plug-in programs perform the same basic function as a CGI program but use a relatively different method of interfacing with the web server software. In particular, plug-in programs use server specific Application Programming Interfaces (API) to communicate with the web server software. Examples of the web server API interfaces include NSAPI from NETSCAPE and ISAPI from Microsoft.

Functionally, relatively little difference exists in the implementation of a site optimizer program in accordance with the present invention using a web server plug-in program or standard CGI, although the code required to implement the functionality as well as the installation of the program is different. One implementation is to use a plug-in program which would obviate the need for redirection of the URL of the test page. In such an implementation, the web server API would allow the plug-in program to intercept the URLs and control how the URL is processed. More particularly, the plug-in program would control all access to the web site, or at least that portion of the web site containing the test page. In such an implementation, the controlling program is directed to invoke the site optimizer program, which could be either a CGI or an API plug-in program, whenever a request is made for the target page. An example of such a controlling program is PWS available from W3.

Server Side Include programming refers to the use of non-standard HTML statements usually incorporated in the form of comments that are supported by some web servers. When the special codes are read in a page being served, the web server software invokes a separate program and inserts the results of that program into the HTML statements returned to the requesting clients. The use of the server side include software requires a modification of the original HTML pages (static or dynamic) to include the appropriate codes to invoke a server side include program. Similar to a CGI or plug-in program, the server side include program makes the selection of an alternative and return appropriate HTML's statements to implement the selected alternative.

Third Party Web Server Extensions are also an alternative to CGI programs for use as the site optimizer program. Similar to Server Side Include programs, Third Party Web Server Extension provide extended codes that can be included in the HTML statements to control the content of the web page. For example, PWS software available from W3 is an example of a Third Party Web Server Extensions that could provide an alternative to CGI programs to implement the site optimizer functions in accordance with the present invention. The Third Party Web Server Extension software may be implemented using a CGI or a web server plug-in program. Similar to Server Side Include software, Third Party Web Server Extensions require modification to the original HTML statements to incorporate the extended codes into the page.

Figure 26:
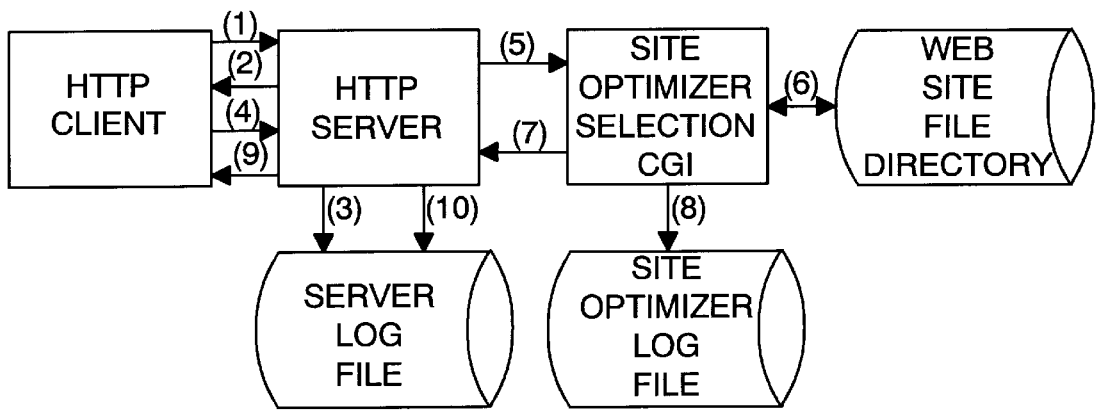
FIG. 26 is a block diagram which illustrates how the process in accordance with the present invention responds to requests from a client for static web pages.
Figure 27:
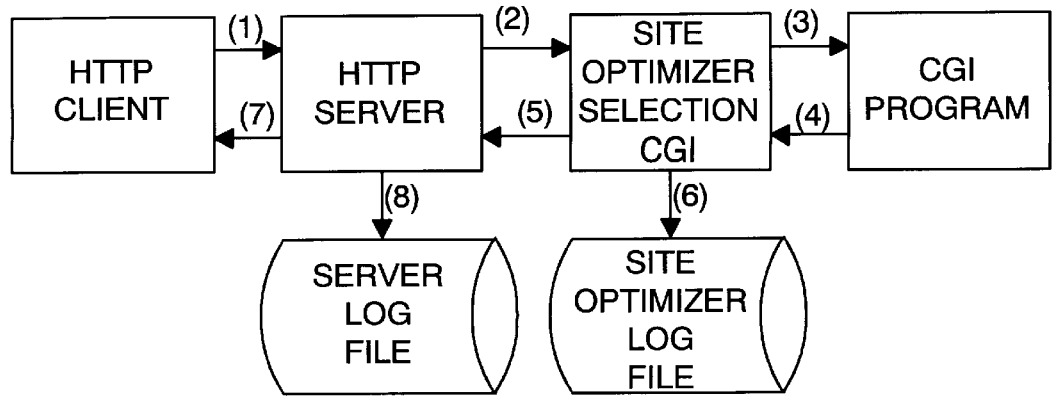
FIG. 27 is similar to FIG. 26 but for dynamic web pages.

FIGS. 26 and 27 illustrate the process represented by step 48 (FIG. 8) in accordance with the present invention for implementing both static and dynamic echo pages, respectively. For static echo pages, as shown as FIG. 26, a client request is made to the server, illustrated by line (1), by providing the URL of the web page of interest. As mentioned above, an important aspect of the invention is that the process for maximizing the effectiveness of a web site is essentially transparent to the system, by way of the redirection process; a known function in various known server software products, such as Apache, NCSA HTTPd, Netscape, O'Reilly Website, and Microsoft Internet Information Server (IIS). In essence, these programs all have in common that a user/client request for a particular URL can be redirected without any modification of the URL for the original page. Thus, the server can return the redirect request to the client on line (2) with the URL of a site optimizer CGI program 60, which, in turn, is logged by the web site server along line (3). As discussed in connection with FIG. 25, the site optimizer CGI program, for example, is used to create the echo page. Once the client receives the URL of the site optimizer CGI program, the URL for the site optimizer CGI program is returned to the web site server along line (4). Once the URL for the site optimizer selection CGI program is received by the web site server, the CGI program is executed by the server along line (5) to select an alternative test page. For static pages, the CGI program can read the file for the static web page from a web site file directory along line (6), as discussed above. Alternatively, CGI programs can be used to actually generate one or more of the static web pages. In any event, assuming that the CGI program is used only to read a static text file for the alternative pages, the text file is read as indicated by the line (6) and returned to the web site server in line (7). After the static test page is read by the CGI file, the request is logged in a site optimizer log file along line (8), and the file is returned to the client along line (9) and logged in the server log file along line (10). The site optimizer log file is used to log requests to each of the alternative pages in order to determine the most effective alternate page to the original home page. FIG. 27 illustrates an embodiment for creating alternative dynamic pages to a dynamic web page, which is similar to the static page discussed above. Returning to FIG. 8, once the web server is configured to redirect requests for the home page, the alternate web pages are run in step 48 according to the predetermined distribution. Subsequently, the test results are analyzed in step 50 as set forth in FIG. 12, discussed below.

Figure 9:
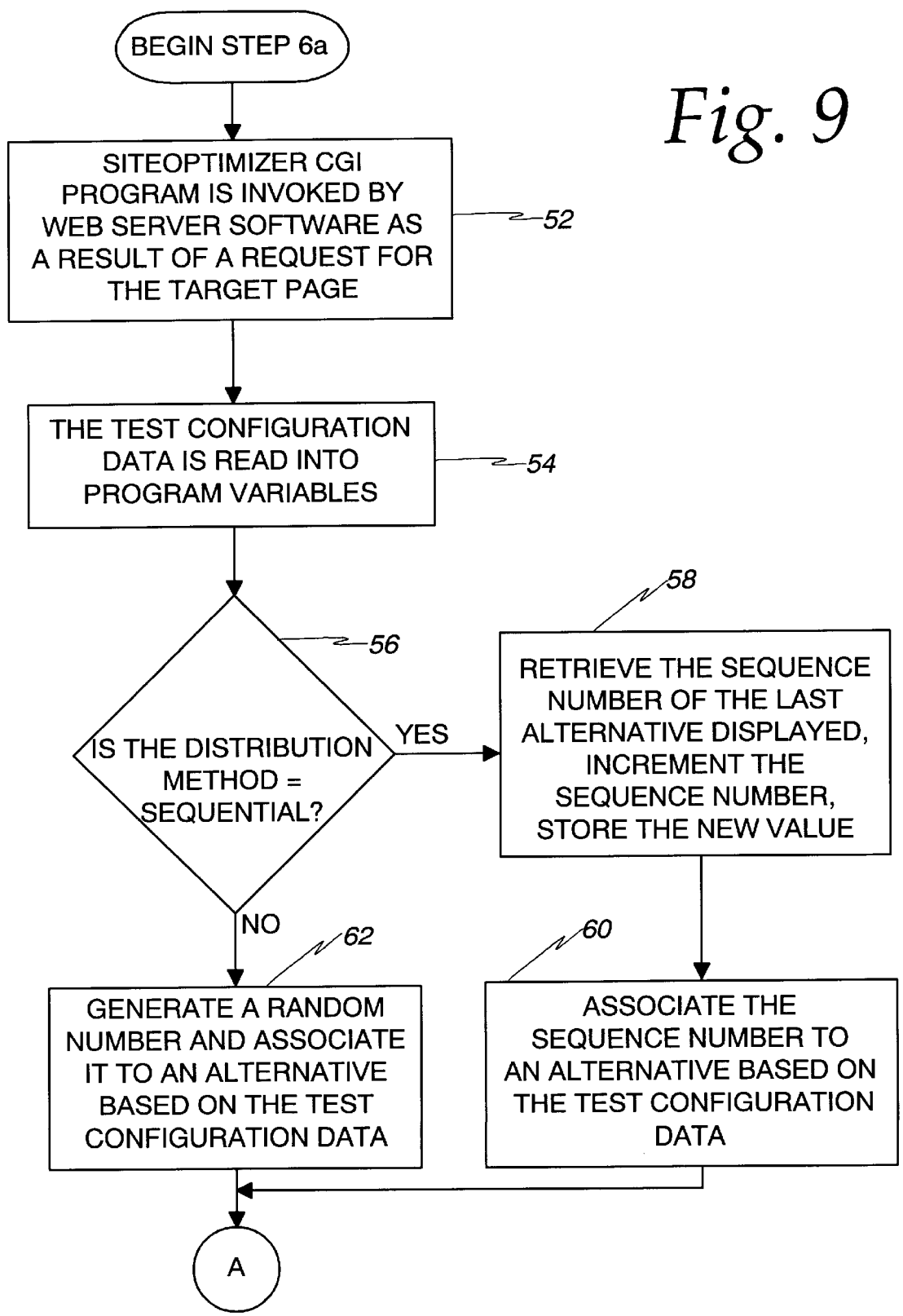
Figure 10:
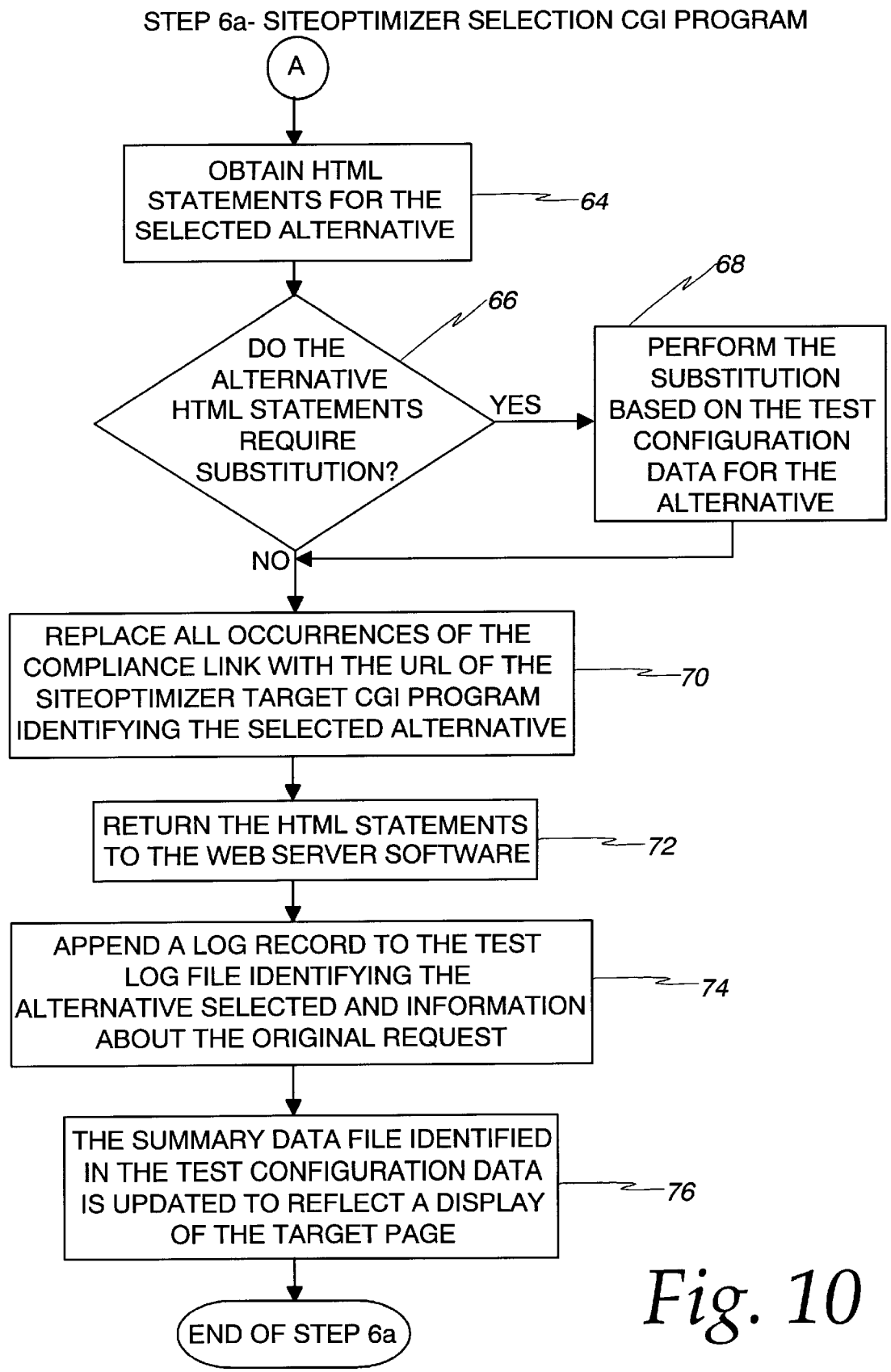

It should be understood by those of ordinary skill in the art that there are various alternatives to redirection, all considered within the broad scope of the present invention. For example, a CGI or plug-in program may be utilized that controls all access to the web site, or at least a portion of the web site pertaining to the test page, as discussed above. In such an implementation, a controlling program is directed to invoke the CGI or an API plug-in program whenever a request is made for the target page. In an application using APIs, the API would allow a plug-in program to intercept the URLs and control how the particular URL is processed. An example of such a controlling program is the PWS program from W3. Alternately, there are various alternatives to CGI programs, as discussed above, which could be used which do not require redirection, for example, Server Side Include software, and Third Party Web Server Extensions. FIG. 9 represents a more detailed flow diagram for a portion of the process performed in step 48, FIG. 8. In particular, as discussed above, alternate or echo pages are returned as a result of the client transmitting the URLs for the original home page to the web site server in step 52. As mentioned above, once the client requests the URL for the original home page, the web server redirects the client to the site optimizer program (CGI or other alternative as discussed above) in accordance with the present invention, as illustrated in step 52. The test configuration data from the site optimizer program is then read into the program variables in step 54. Subsequently, the system checks for the preferred distribution method among the alternative web pages. Thus, in step 56, the system checks whether the distribution method is to be sequential or random. For sequential distribution among the alternative web pages, sequence numbers are assigned to each of the alternatives. Any time an alternate web page is accessed, the sequence number of the particular web page last accessed is stored in a file. Thus, for sequential distribution, the sequence number of the last alternate is accessed and incremented to the new sequence number. The new sequence number is then stored in step 58. The sequence number is then used in step 60 to correlate with one of the alternative home pages.

If a non-sequential method for distribution is to be used, for example, a random distribution, a random number is generated in step 62 and correlated with one of the alternate or echo pages. After the particular alternative or echo page is selected, the CGI program or static text file is accessed in step 64 for the selected alternate or echo page. Depending on the particular echo page selected, whether static or dynamic, the system determines in step 66 whether alternate HTML statements need to be manipulated. For example, if the alternative is the original web page, then no substitution is required. However, if an alternative page is selected, the alternate page is generated as discussed above in step 68 based upon the configuration file as discussed in connection with step 44, which allows alternative pages to be implemented by altering a single string within the HTML to represent each alternative. In step 70 the compliance link for the original home page is replaced with the URL of a CGI program (site optimizer target CGI program) or alternatively with a plug-in SSI or Third Party extension program as discussed above for recording the selection of the compliance link. Subsequently, as discussed above, the CGI program or static file is returned to the web server in step 72. In order to keep track of the alternate web page being returned to the client, a log record is maintained of the selected alternative in steps 74 and 76.

The system allows testing unique visitor characteristics and the ability to relate test results to visitors. For instance, if it is believed that men and women react differently to a variable being tested, the user can keep track separately of test results among women and men, to the extent that information is known. Also, a test may even present a different set of alternatives (echoes) to men and women. This capability may include whatever characteristics are known about the visitor. These characteristics include past behavior of the visitor when they previously visited the site, or on their current visit, in that it is possible to track a visitor's behavior in a website in real time.

Figure 11:
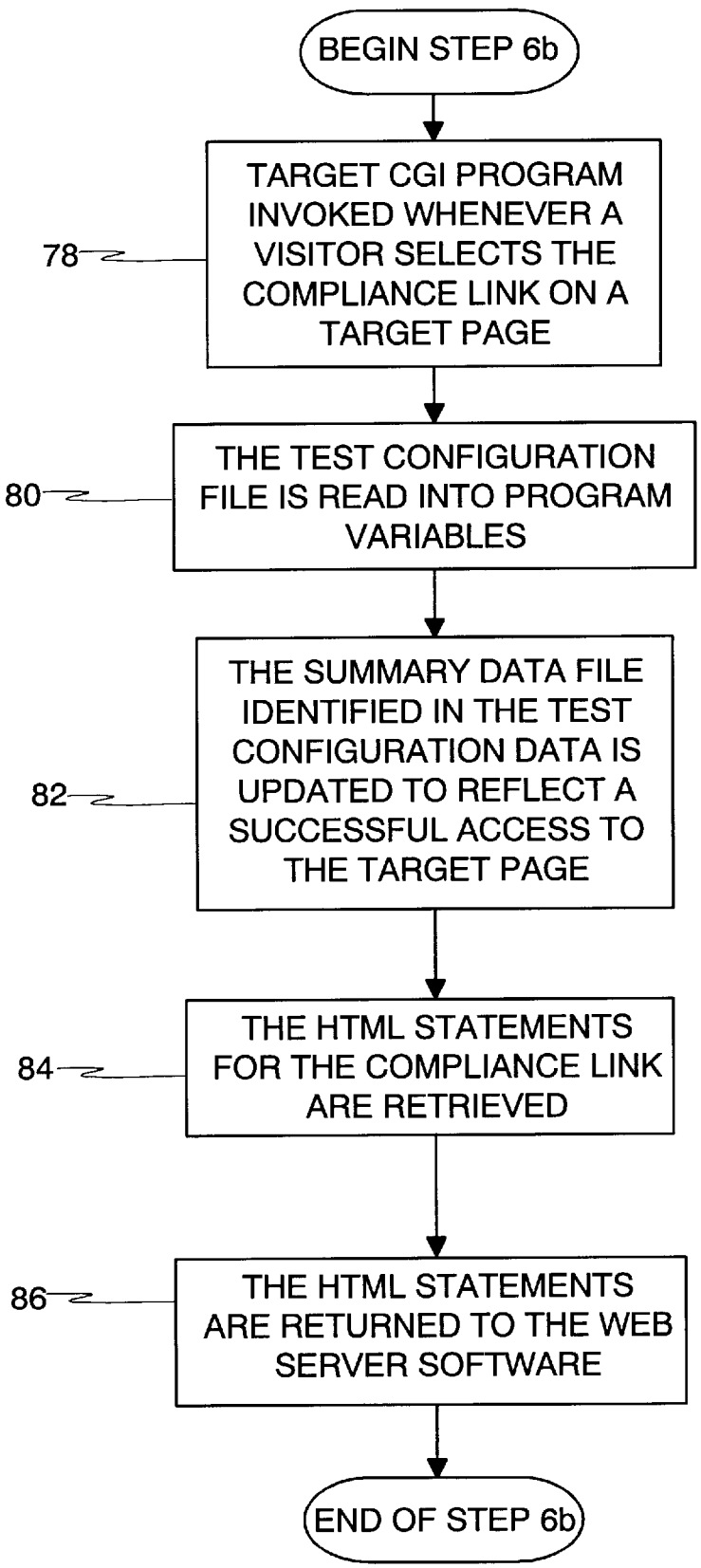

FIG. 11 is a more detailed flow diagram for another portion of the process performed in step 50, FIG. 8. In particular, as mentioned above, the alternate web pages are returned any time a visitor selects a compliance link on a target page. More particularly, in step 78, a target CGI program (or alternatively a plug-in program, SSI or 3rd Party extension program as discussed above) is invoked by the compliance link by way of the site optimizer program, substituting the URL for the target CGI program for the URL of the compliance link. In steps 80 and 82, the target CGI program records the fact that the compliance link was selected. In steps 84 and 86, the HTML statements for the compliance link are retrieved and the statements are returned to the web server software.

Figure 12:
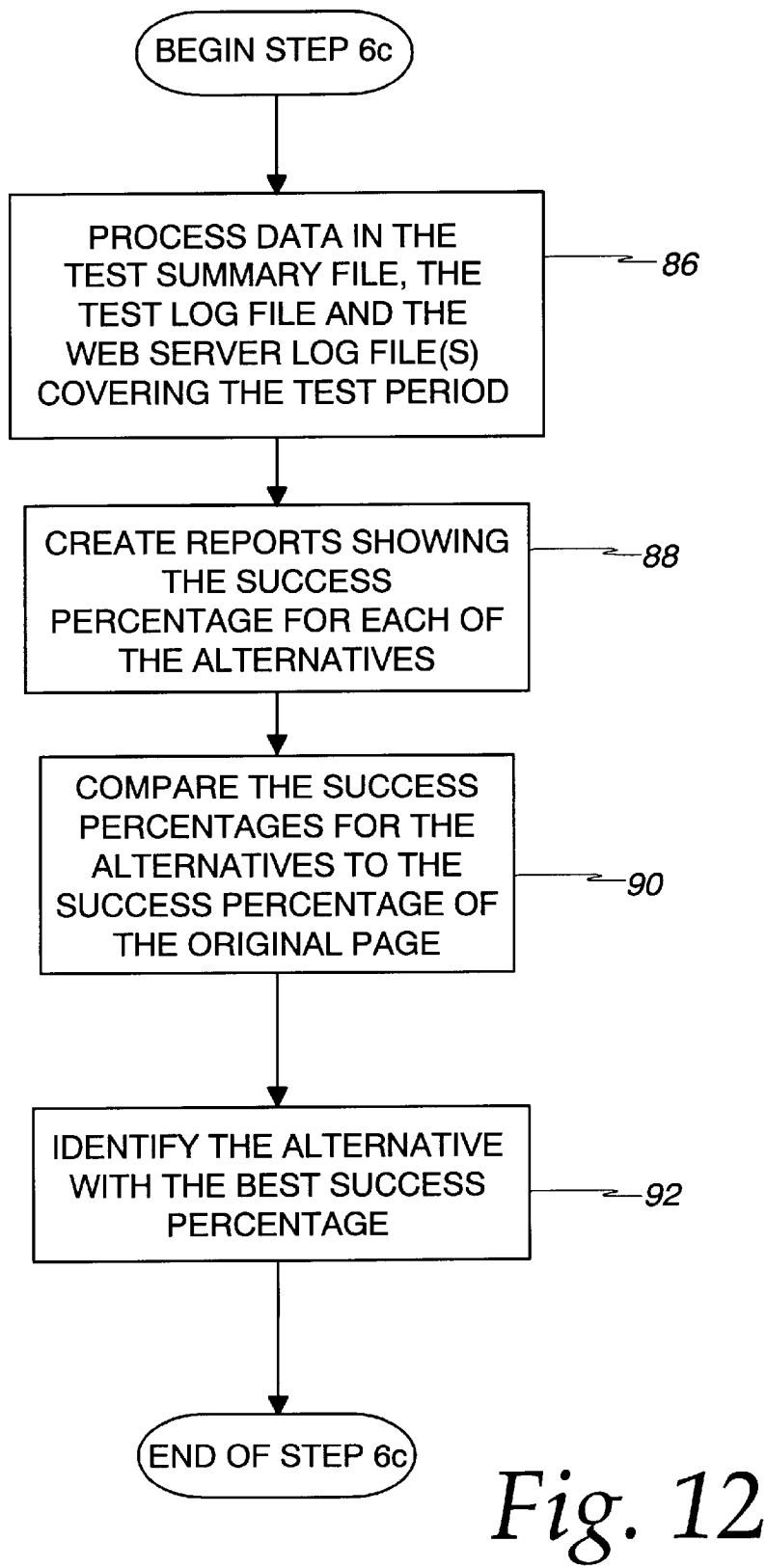

FIG. 12 is a detailed flow diagram for the process in step 50, FIG. 8. After the tests are conducted, the test data is analyzed, for example, as illustrated in FIG. 12. Initially, in step 86, the data in the test summary file, test log file and web server log file is analyzed for the period in question in order to determine the most effective of all of the alternatives. For example, in step 88, reports could be created showing the success percentage for each of the alternatives, and in step 90, these percentages can be compared in order to identify the best alternative in step 92.

Figure 13:
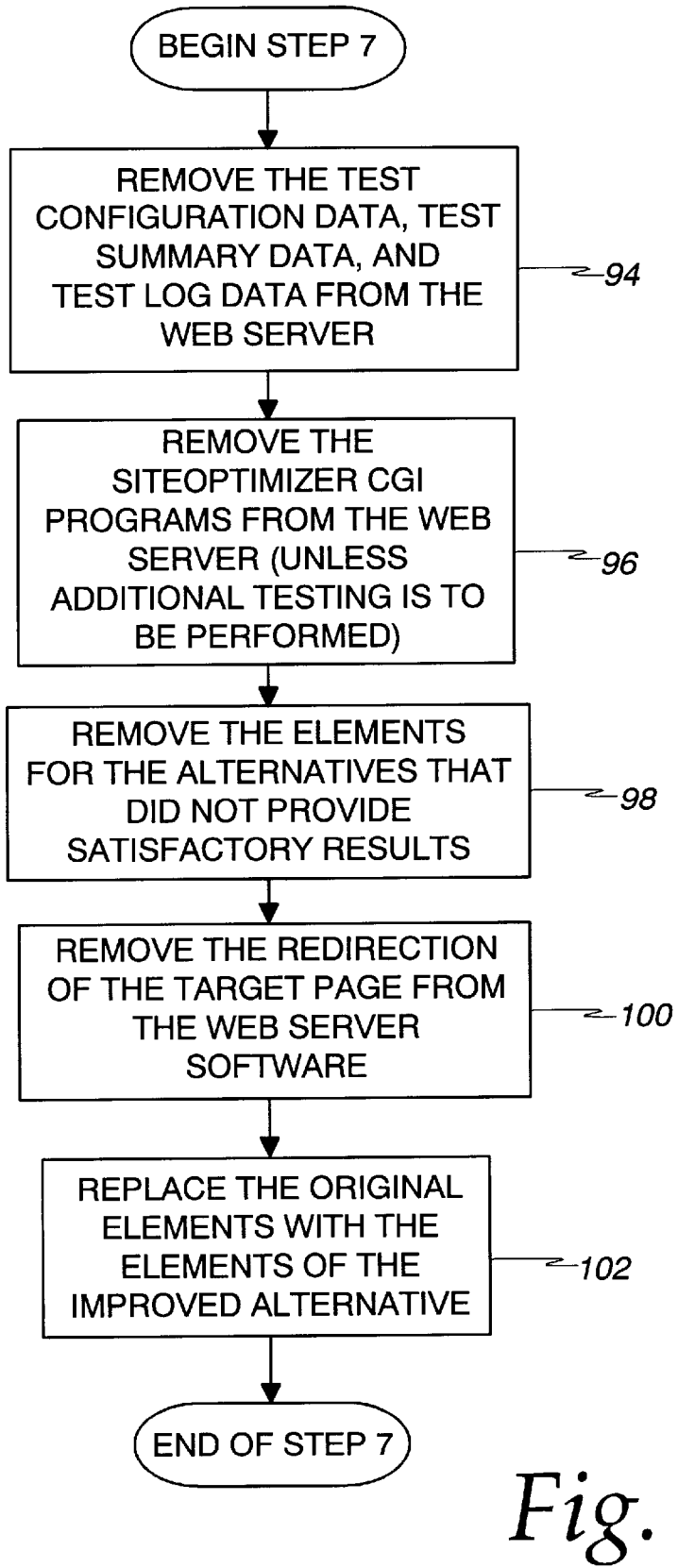

After the best alternative web page is identified, the alternate web page is implemented in step 7, as illustrated in FIG. 13. In particular, the test configuration data, test summary data and test log data is removed from the web server files in step 94. Since alternative pages will no longer need to be generated, the CGI programs for creating the alternative web pages are removed from the web server file in step 96, as well as any elements of the alternative web pages that did not provide satisfactory results in step 98. Since the successful alternative page will be implemented replacing the original web page, the redirection of the web page is removed from the web server software in step 100, and the URL for the successful alternate page is replaced in step 102.

The Source Code for implementing the line steps of the process is provided in the Table.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

TABLE

- 26 -

```perl
#!/usr/local/bin/perl5

********************
********************
********************
*********
# select1.pl
# This is a CGI program
that will control the testing
of multiple
# alternatives to a selected
test page as part of the
SiteOptimizer(tm)
# testing facility.

# The testing is based on
data contained in a test
configuration file.
# select1.pl will be
invoked whenever a
request is processed by the web server for the test
page. The program will
select based on
# configuration parameter
values, one of several
alternative versions
# of the test page. The
program will return the
HTML statements for
# the selected alternative
and record the event in a
log file as well
# as in a summary dbm
database.

# The program will modify
all occurrences of the
target link being
# tested to refer to the
target1.pl CGI program.

# Copyright 1996, NetROI.
All rights reserved.

********************
********************
********************
********* require "cgi-lib.pl";
require "soldcnfg.pl";

$LOCK_SH = 1;      #
Shared File Lock (flock)
Option
$LOCK_EX = 2;      #
Exclusive File Lock (flock)
Option
$LOCK_NB = 4;      # Non-
Blocking File Lock (flock)
Option
$LOCK_UN = 8;      #
Unlock File Lock (flock)
Option srand(time|$$);    # seed
the random number
generator
$Config_FileName =
"/home/ggarrick/netroi/corp
test.conf";
$Curr_Time = time;
print &PrintHeader;    #
output required HTTP
header for HTML content
that follows &load_config($Config_FileN
ame) || &CgiError("Unable
to load configuration file -
$Config_FileName");

&Process_HTML(&Select_A
LT);   # Select_Alt returns
the alternative name which
is passed to Process_HTML &Make_Log_Entry;

&Update_Summary;

# *****************
Start Subroutines sub Process_HTML {

This subroutine expects
a parameter containing the
name of the alternative to
be
# displayed. Using the
configuration data, the
alternative file name
(HTML_File)
# will be read. The
Find_and_Replace
subroutine is called for
each line read from
# the HTML file. Each line
is then returned (via print)
to the web server.

$Current_ALT_Name
= $_[0];
    $HTML_File =
$ALT_FileName{$Current_
ALT_Name};
    $Search_String =
$ALT_Search{$Current_AL
T_Name};
    $Replace_String =
$ALT_Replace{$Current_A
LT_Name};

open (HTML,
"<$HTML_File") ||
&CgiError("Cannot Open
HTML File $HTML_File for
Alternative
$Current_ALT_Name");
    while (<HTML>) {
        print
&Find_and_Replace($_);
    } # end while
    close HTML;
} # end Process_HTML sub Find_and_Replace { this subroutine
processes a single HTML
line passed as a parameter.
# first the search/replace
strings from the alternative
are applied to
# the line. This allows
simple alternatives to use a
single HTML file
# and just alter a single
string (for example, a gif
file name)
# for each alternative.

# The Fix_Relative_URL
and Replace_Target
subroutines are then called
# passing them the HTML
line.

# The HTML line with any
and all modifications is
then returned.

    local($HTML_Line) =
$_[0];
```

- 27 -

```
        $HTML_Line = ~
s/$Search_String/$Replace
_String/;
        $HTML_Line =
&Fix_Relative_URL($HTML_
Line);
        $HTML_Line =
&Replace_Target_URL($HT
ML_Line);
        return $HTML_Line;
} # end Find_and_Replace sub Fix_Relative_URL {
This subroutine
processes a single line of
HTML passed as a
parameter.
# The line is returned after
any needed modifications
have been made.

# The line is checked for
relative URLs so they can
be changed to full
# URLs. This is necessary
because the URLs are
relative to the location
# of the test page HTML
file and not to the location
of this CGI program
# which may be different.

# URL_Prefix forms the full
URL path to the test page.
This is added to
# the relative URL to make
it a full URL representing
the same resource
# that it pointed to relative
to the test page.

# FileName is used to
complete the qualification
of named anchors within
# the test page.

# Relative URLs occur as
values for href and src
attributes.
# If the attribute value
begins with "http:", ":", or
"/" then it is not
# a relative URL and does
not need to be modified.
Only href attributes
# can contain named
anchors as relative URL
values.

# When a relative URL is
found, the URL_Prefix is
inserted between the
# attribute (href or src)
name and the relative URL
to form a full URL
# reference.

        local($HTML_Line) =
$_[0];
        local($URL_Prefix) =
"http://$ENV{\"SERVER_N
AME\"}$ALT_PathName{$
Current_ALT_Name}";
        local($FileName) =
$ALT_FileName{$Current_
ALT_Name};
        local($result,
$URL_Path);

$FileName = ~
s/.*\/(.*)$/\1/;          #
separate just the file name
        if ($HTML_Line = ~
/href = \"[http:|:|\/]/i) {  #
leave these alone
            $result =
$HTML_Line;
        } else {          #
otherwise fix the URL
            if ($HTML_Line
= ~ /href = \"#/i) {       #
for named anchors $URL_Path =
$URL_Prefix.$FileName;#
include the filename
            } else {

$URL_Path = $URL_Prefix;
# just use the prefix
            } # end if if
(($HTML_Line = ~
/href = \"/i) && !($' = ~
/:/)) { # find the reference
avoiding protocols other
than http
                $result =
$'.$&.$URL_Path.$';   #
insert the path
            } else {
                $result =
$HTML_Line;         #
return it unchanged
            } # end if
        } # end if $HTML_Line =
$result;

if ($HTML_Line = ~
/src = \"[http:|:|\/]/i) {   #
leave these alone
            $result =
$HTML_Line;
        } else {
            # otherwise fix
the URL
            if ($HTML_Line
= ~ /src = \"/i) {
                $result =
$'.$&.$URL_Prefix.$';
            } else {
                $result =
$HTML_Line;
            } # end if
        } # end if return $result;
} # end Fix_Relative-URL sub Replace_Target_URL {
This subroutine
processes a single line of
HTML passed as a
parameter.
# The line is returned after
any needed modifications
have been made.

# The line is checked for
any reference to the target
link identified
# for the selected
alternative. If found, the
reference is replaced
# with a link to the
target.pl CGI program with
a parameter containing
# the sequence number of
the alternative that was
selected.

        local($HTML_Line) =
$_[0];
        local($Target_URL) =
"http://$ALT_Target{$Curr
ent_ALT_Name}";
        local($CGI_URL) =
&MyBaseUrl;
        $CGI_URL = ~
s/select1.pl/target1.pl/i;
        $HTML_Line = ~
s#$Target_URL#$CGI_URL.
"?".&Current_Sel#ie;
        return $HTML_Line;
} # end
Replace_Target_URL sub Current_Sel {
This subroutine will
return the sequence
number of the currently
```

- 28 -

```perl
# selected alternative
(Current_ALT_Name).

    local($x, $result);
    for ($x = 1; $x <=
$Alternatives; $x++) {
        if
($Current_ALT_Name eq
$ALT_SEQ{$x}) {
            $result =
$x;
            last;
        # take the first
match
        } # end if
    } # end for
    return $result;
} # end Current_Sel sub Select_ALT {
This subroutine will
return the alternative name
for the next
# alternative to be
displayed. The method of
selection is determined
# by the configuration
parameter value,
Dist_Method. Random is
the
# default unless
Dist_Method equals
"Sequential".

    local($result);
    if ($Dist_Method eq
"Sequential") {
        $result =
&Next_ALT;
    } else {
        $result =
&Random_ALT;
    } # end of if
    return $result;
} # end Select_ALT sub Next_ALT {
For sequential
distribution, a selection file
is maintained with
# the sequence number of
the last alternative
displayed. This subroutine
# reads the value from
that file, increments it by
one and updates
# the selection file to
reflect the new value.

# The alternative name
that corresponds to the
new sequence number is
# then returned.

    if (-r
$Select_FileName) {    # is
the selection file readable?
        if (open (SEL,
"+<$Select_FileName")) {
yes, then open it for I/O flock(SEL, $LOCK_EX); #
obtain an exclusive lock on
the file seek(SEL, 0, 0);    #
make sure we are at the
beginning of the file
        read(SEL,
$packed_string, 22);    #
read in the selection
number
                ($string1,
$seq_num) =
unpack("A18i",$packed_str
ing); # unpack the
selection number
        } else {    #
the open failed &CgiError("<P>Selection
file error:

$Select_FileName");    #
error message $seq_num = 0;    #
start the sequence number
at zero
        }    # end if
    } else {    #
selection file not readable
        if (open (SEL,
"+>$Select_FileName")) {
try to create a new one flock(SEL, $LOCK_EX); #
obtain an exclusive lock $seq_num = 0;    #
set the sequence number
to zero
        } else {    #
the open failed &CgiError("<P>Selection
file error:
$Select_FileName");    #
error message $seq_num = 0;    #
start sequence number at
zero
        }    # end if
    } # end if
    $seq_num++;    #
increment the sequence
number
    if ($seq_num >
$Alternatives) {    # if
> number of alternatives
        $seq_num =
1;    #
start over at number one
    }
    if (seek (SEL,0,0)
== 1) {    #
return to the beginning of
the file print SEL
pack("A18i", "Current
Selection ", $seq_num);  #
output the new value
    } else {    #
problem with the file
        flock(SEL,
$LOCK_UN);    #
release the lock
        close (SEL);#
close the file &CgiError("<P>Seek
failed on write");    #
error message
    }
    flock(SEL,
$LOCK_UN);    #
release the lock
    close (SEL);    #
close the file
    return
$ALT_SEQ{$seq_num};#
alternative name for seq
number
} # end Next_ALT sub Random_ALT {
This subroutine will
select an alternative
number at random and
return
# the alternative name that
corresponds to the random
selection.

# The percentages of each
alternative are accumulated
until a random
# number between 1 and
100 is less than the
accumulated value, then
the
# last alternative added is
the selection.

```

- 29 -

```
# This will allow the
distribution to be controlled
by the tester with
# uneven distribution
between the alternatives
being possible as long
# as the percentages add
up to 100.

local($accum_percent) =
0;
    local($result) =
$ALT_SEQ{1};          #
default to first alternative
    local($rand_num) =
int(rand(100)) + 1;  # get
random integer from 1 to
100 foreach $alt (sort
keys(%ALT_Percent)) {

$accum_percent + =
$ALT_Percent{$alt};
        if ($rand_num
< = $accum_percent) {
            $result =
$alt;
            last;
        } # end of if
    } # end of foreach
    return $result;
} # end Random_ALT sub Update_Summary {
This subroutine updates
the summary dbm database
identified for this test in
# the configuration file.

# The latest time in the
timestamp record is
updated to reflect the time
of the
```

```
# display of the
alternative.
# The Test summary
record is updated to add
one to the display count.
# The Alternative record is
updated to add one to the
display count.

dbmopen(%Summary,$Su
mmary_FileName,undef) ||
&CgiError("dbmopen error
in Update_Summary");

$Key_Timestamp =
pack("A25A25"," "," ");
    $Key_TestSumm =
pack("A25A25",
$Test_Name," ");
    $Key_AltSumm =
pack("A25A25",
$Test_Name,
$Current_ALT_Name);

($Start_Time,
$Latest_Time) =
unpack("ll",$Summary{$Ke
y_Timestamp});
    ($Test_ALTs,
$Test_Requests,
$Test_Success) =
unpack("iii",
$Summary{$Key_TestSum
m});
    ($ALT_Display,
$ALT_Success) =
unpack("ii",
$Summary{$Key_AltSumm
});

$Test_Requests+ +;
    $ALT_Display+ +;

$Summary{$Key_Timestam
```

```
p} =
pack("ll",$Start_Time,
$Curr_Time);

$Summary{$Key_TestSum
m} = pack("iii",
$Test_ALTs,
$Test_Requests,
$Test_Success);

$Summary{$Key_AltSumm
} = pack("ii",
$ALT_Display,
$ALT_Success);

dbmclose(%Summary);
} # end Update_Summary sub Make_Log_Entry {
This subroutine appends
a log entry to the test log
file identified in the
# test configuration file.

# The log entry contains:
Remote Host
#                Remote
Ident or "-"

Remove_User or "-"

TimeStamp
[dd/mmm/yyyy:hh:mm:ss -
0000] (-0000 is relative to
GMT)
#                  CGI
Program URL
#                  Test
Name

Sequence Number of
selected alternative

Alternative Name
```

```
#                User
Agent or "-"
#               Referrer
or "-"
#                Cookie
or "-"

    if (open
(LOGFILE," > > $Log_FileNa
me")) {       # open
file
        flock(LOGFILE,
$LOCK_EX);         #
get exclusive lock
        seek(LOGFILE,
0, 2);             #
go to end of file
        print LOGFILE
$ENV{"REMOTE_HOST"}."
".

($ENV{"REMOTE_IDENT"}
? $ENV{"REMOTE_IDENT"}
: "-")." ".

($ENV{"REMOTE_USER"} ?
$ENV{"REMOTE_USER"} :
"-")." ".

&DateTime_Stamp($Curr_T
ime)." ".

"\"".&MyBaseUrl."\" ".

"\"".$Test_Name."\" ".

&Current_Sel." ".

"\"".$Current_ALT_Name."
\" ".

($ENV{"HTTP_USER_AGEN
T"} ?
"\"".$ENV{"HTTP_USER_A
GENT"}."\"" : "-")." ".
```

- 30 -

```perl
($ENV{"HTTP_REFERER"}
?
"\"".$ENV{"HTTP_REFERER"}."\"" : "-")." ".

($ENV{"HTTP_COOKIE"} ?
"\"".$ENV{"HTTP_COOKIE"}."\"" : "-")."\n";
        flock(LOGFILE,
$LOCK_UN);          #
release lock
        close
(LOGFILE);          #
close file
    }    # there is
nothing that can be done if
the log file will not open
} # end Make_Log_Entry sub DateTime_Stamp {
format date and time for
the log file

    local($Time) = $_[0];
    local($sec, $min,
$hour, $mday, $mon,
$year, $wday, $yday,
$isdst) = localtime($Time);
    local($Month) =
(Jan,Feb,Mar,Apr,May,Jun,
Jul,Aug,Sep,Oct,Nov,Dec)[
$mon];
    local($TZone) =
&Time_Zone(($ENV{"TZ"}
? $ENV{"TZ"} :
"US/Central"),$isdst);
    local($dhour) =
substr("00".$hour,-2);
    local($dmin) =
substr("00".$min,-2);
    local($dsec) =
substr("00".$sec,-2);
    return
"[$mday/$Month/19$year:
$dhour:$dmin:$dsec -
$TZone]";
} # end DateTime_Stamp sub Time_Zone {
set the time zone relative
to GMT
# this currently only works
for US/Central time

    local($TZ) = $_[0];
    local($DST) = $_[1];
    local($Zone);
    if ($TZ eq
"US/Central") {
        $Zone = 6;
    } else {
        $Zone = 0;
    }
    if ($DST) {$Zone -=
1;}
    $Zone =
substr("0".$Zone."00",-4);
    return $Zone;
} # end Time_Zone
```

```perl
#!/usr/local/bin/perl5

# *********************
# *********************
*****************
# target1.pl
# this CGI program will be
invoked whenever the
visitor
# selects the target link
identified in the
configuration
# file. That is because the
select.pl program will
replace
# each occurrence of the
target link with a link to
this
# program (target.pl).
select.pl will pass the
sequence
# number of the
alternative displayed in the
URL.
# (ie.
http://server.name/path.name/target.pl?2 for
# alternative 2.)

# This program will load
the configuration file and
then,
# based on the alternative
number, access the
alternative
# name which is then used
to get the URL of the target
# page. The Target URL is
then returned to the server
# in the HTTP redirection
header as the location
value.

# Copyright 1996, NetROI.
All rights reserved.
```

```perl

# *********************
# *********************
***************** require "cgi-lib.pl";
require "soldcnfg.pl";

$Config_FileName =
"/home/ggarrick/netroi/corp
test.conf";

if
(&load_config($Config_File
Name)) { # load the
configuration file
} else {
    &CgiDie("Unable to
load configuration file
$Config_FileName");
}

&ReadParse;
# get the query values
from the URL get the alternative name
based on the sequence
number from the URL
$Current_ALT_Name =
$ALT_SEQ{$ENV{"QUERY_
STRING"}};

# send an HTTP
redirection header with the
target URL as the location
print "Status: 302
Redirection\n";
print "Location:
http://$ALT_Target{$Curre
nt_ALT_Name}\n\n";

# update the summary file
to indicate that the target
link was selected
```

1. A process for optimizing the effectiveness of a web site having a test web page with a predetermined uniform resource location (URL) and one or more linked web pages, the process comprising the steps of:
   (a) creating one or more alternate web pages;
   (b) configuring said alternate web pages in effective parallel paths with the test web page;
   (c) distributing requests to said test web page and said one or more alternate web pages according to a predetermined distribution function;
   (d) counting the visits to said one or more linked web pages by way of said test web page and said one or more alternate web pages; and
   (e) replacing said test web page with said alternate page with the largest number of visits to said one or more linked pages.

2. The process as recited in claim 1, wherein said predetermined distribution function is a sequential function.

3. The process as recited in claim 1, wherein said predetermined distribution function is a random function.

4. The process as recited in claim 1, wherein step (c) comprises the steps of:
   (a) receiving requests for the URL for said test web page;
   (b) redirecting said requests to the alternate web pages in accordance with a predetermined distribution function.

5. The process as recited in claim 1, further including the step:
   (f) repeating steps (a)–(e).

6. A process for directing requests for a test web page having a predetermined universal resource location (URL) comprising the steps of:
   (a) providing one or more alternate web pages;
   (b) configuring said alternate web pages in parallel paths with said test web page;
   (c) distributing requests to said test web page and said alternate pages according to a predetermined distribution function wherein said requests are distributed by redirecting requests from said test web page to the alternate web pages in accordance with a predetermined distribution function.

7. The process as recited in claim 6, wherein said predetermined distribution function is a random function.

8. The process as recited in claim 6, wherein said predetermined distribution function is a sequential function.

* * * * *